(12) United States Patent
Hasegawa

(10) Patent No.: US 9,889,697 B2
(45) Date of Patent: Feb. 13, 2018

(54) IMAGE PROCESSING APPARATUS, IMAGE PROCESSING SYSTEM, IMAGE PROCESSING METHOD, AND RECORDING MEDIUM

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 30 days.

(21) Appl. No.: 15/077,760

(22) Filed: Mar. 22, 2016

(65) Prior Publication Data
US 2017/0004752 A1    Jan. 5, 2017

(30) Foreign Application Priority Data

Jun. 30, 2015  (JP) .................................. 2015-132133

(51) Int. Cl.
*B42D 9/04*    (2006.01)
*H04N 1/401*   (2006.01)
*H04N 1/409*   (2006.01)
*H04N 1/387*   (2006.01)

(52) U.S. Cl.
CPC ............. *B42D 9/04* (2013.01); *H04N 1/3872* (2013.01); *H04N 1/401* (2013.01); *H04N 1/409* (2013.01); *H04N 1/4095* (2013.01)

(58) Field of Classification Search
CPC ........ B42D 9/04; H04N 1/3872; H04N 1/401; H04N 1/409; H04N 1/4095; G09G 2320/0233; G09G 2320/0693; G09G 2320/0686
See application file for complete search history.

(56) References Cited

U.S. PATENT DOCUMENTS

| 2003/0063334 | A1* | 4/2003 | Mandel | H04N 1/00607 |
| | | | | 358/498 |
| 2014/0059903 | A1* | 3/2014 | Li | B42D 9/04 |
| | | | | 40/533 |
| 2014/0078561 | A1* | 3/2014 | Hasegawa | H04N 5/232 |
| | | | | 358/474 |
| 2014/0168726 | A1* | 6/2014 | Hasegawa | B42D 9/06 |
| | | | | 358/479 |
| 2014/0177011 | A1* | 6/2014 | Hasegawa | H04N 1/19594 |
| | | | | 358/474 |

(Continued)

FOREIGN PATENT DOCUMENTS

JP    2005269451 A    9/2005
JP    2015003446 A    1/2015

*Primary Examiner* — Stephen Sherman
(74) *Attorney, Agent, or Firm* — Holtz, Holtz & Volek PC

(57) ABSTRACT

An image processing apparatus includes a first correction amount acquiring unit and a first correction unit. The first correction amount acquiring unit acquires a first luminance correction amount of each block based on the luminance of each pixel in the block obtained by dividing a first image among multiple processing target images obtained by imaging a target object with multiple sheets bound together while opening the target object. The first correction unit corrects the luminance of each pixel in the multiple processing target images based on the first luminance correction amount of each block acquired by the first correction amount acquiring unit.

19 Claims, 21 Drawing Sheets

(56) References Cited

U.S. PATENT DOCUMENTS

2014/0366412 A1* 12/2014 Hasegawa ............... B42D 9/04
40/530
2015/0341520 A1* 11/2015 Takeishi .................. H04N 1/44
358/509

* cited by examiner

IMAGE PROCESSING APPARATUS, IMAGE PROCESSING SYSTEM, IMAGE PROCESSING METHOD, AND RECORDING MEDIUM

BACKGROUND OF THE INVENTION

1. Field of the Invention

The present invention relates to an image processing apparatus, an image processing system, an image processing method, and a recording medium.

2. Description of the Related Art

Data including multiple images obtained by imaging multiple pages sequentially with a digital camera or the like while turning the pages of a book may be used. In such a case, the luminance of an image obtained by imaging a page of the book may become uneven, i.e., luminance unevenness may occur due to the unevenness of light illuminated on the page of the book, the curvature of the page in such a state that the book is open, and the like. Since the unevenness of shade partially occurs or characters in bright portions blur in the image having uneven luminance, the image may be difficult to see.

For example, Japanese Patent Application Laid-Open Publication No. 2005-269451 (hereinafter called Patent Document 1) discloses a technique for correcting the luminance unevenness of an original document image obtained by imaging the original document. In general, the correction for removing luminance unevenness to make the luminance of an image uniform is also called shading correction.

An image processing apparatus disclosed in Patent Document 1 checks a value of the luminance of each pixel in each block obtained by dividing the original document image, acquires, for each block, a luminance value corresponding to the sheet of the original document, and determines a shading correction value of each block based on the luminance value. Then, based on the determined shading correction value, shading correction is made to pixels in each block. The luminance unevenness of multiple images seems to be corrected by applying the technique disclosed in Patent Document 1 to the multiple images obtained by imaging multiple pages of a book, respectively.

However, in order to correct the luminance unevenness of the multiple images corresponding to the multiple pages of the book, respectively, using the image processing apparatus disclosed in Patent Document 1, a series of processes as mentioned above need to be performed on each image. This may increase the processing load on the image processing apparatus.

Such a problem that the processing load for correcting the luminance unevenness of multiple images increases is not limited to the case of imaging multiple pages while a book is open, and this may also happen in a case of imaging multiple pages while a file with documents and the like bound together is open.

SUMMARY OF THE INVENTION

The present invention has been made in view of the foregoing circumstances, and it is an object thereof to reduce the processing load for correcting the luminance unevenness of multiple images captured while an object with multiple sheets bound together is open.

An image processing apparatus according to a first aspect of the present invention includes: a first correction amount acquiring unit which acquires a first luminance correction amount of each block based on the luminance of each pixel in the block obtained by dividing a first image among multiple processing target images obtained by imaging a target object with multiple sheets bound together while opening the target object; and a first correction unit which corrects the luminance of each pixel in the multiple processing target images based on the first luminance correction amount of the block.

An image processing system according to a second aspect of the present invention includes: the image processing apparatus according to the first aspect; and an imaging device which captures each of the multiple processing target images.

An image processing method according to a third aspect of the present invention includes: acquiring a luminance correction amount of each block based on the luminance of each pixel in the block obtained by dividing a first image among multiple processing target images obtained by imaging a target object with multiple sheets bound together while opening the target object; and correcting the luminance of each pixel in the multiple processing target images based on the luminance correction amount of the block.

A non-transitory computer-readable recording medium according to a fourth aspect of the present invention is a non-transitory computer-readable recording medium with a program executable by a computer stored thereon, the program causing the computer to perform functions including: acquiring a luminance correction amount of each block based on the luminance of each pixel in the block obtained by dividing a first image among multiple processing target images obtained by imaging a target object with multiple sheets bound together while opening the target object; and correcting the luminance of each pixel in the multiple processing target images based on the luminance correction amount of the block.

BRIEF DESCRIPTION OF THE SEVERAL VIEWS OF THE DRAWING

The present invention will become more fully understood from the detailed description given below and the accompanying drawings.

DETAILED DESCRIPTION OF THE INVENTION

Figure 1:
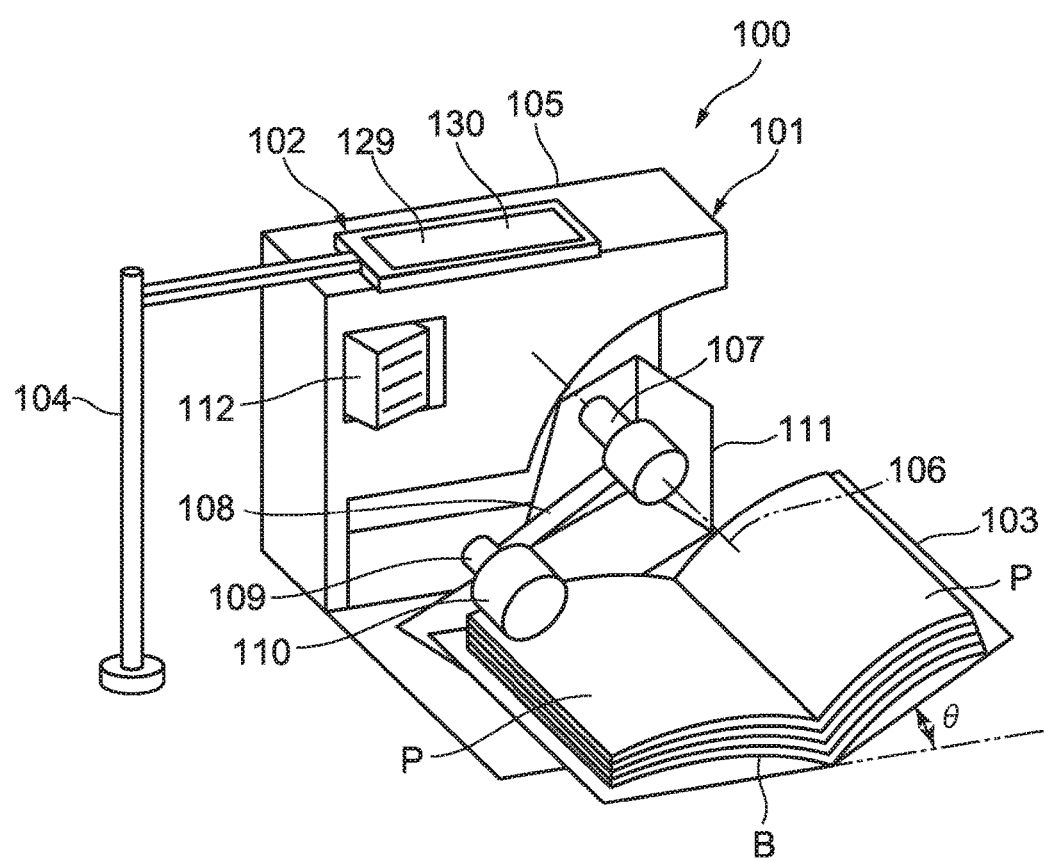
FIG. 1 is a perspective view showing the configuration of an image processing system according to Embodiment 1 of the present invention.

Embodiments of the present invention will be described below with reference to the drawings. Note that the same or corresponding parts in the drawings are given the same reference numerals.

(Embodiment 1)

An image processing system 100 according to Embodiment 1 of the present invention is a system configured to digitize target objects with multiple sheets bound together. The target objects with multiple sheets bound together include a collection of papers stapled together, a file with papers, and the like bound together as well as a book with sheets bound together and a magazine. In the embodiment, description will be made by taking a book as an example.

As shown in FIG. 1, the image processing system 100 includes: a page-turning device 101 which turns pages P of a book B in order; and a terminal device 102 which, when the page-turning device 101 turns to a page P to be imaged, images the page P, and performs image processing on the captured image as a processing target image. The terminal device 102 is, for example, a smartphone. The page-turning device 101 and the terminal device 102 are configured to be able to communicate with each other wirelessly or through a wired line, not shown. A personal computer or a tablet terminal may be used as the terminal device 102.

In the embodiment, it is assumed that the book B has a cover, pages from the first page to the 2N-th page (where N is an integer of 1 or more), and a back cover in this order.

As shown in FIG. 1, the page-turning device 101 includes: a holding stand 103 which holds an opened book B; a stand 104 which fixes the position and posture of the terminal device 102 relative to the book B; a storage case 105 having a substantially rectangular parallelepiped shape; a first drive unit 107 having a drive shaft 106; an arm part 108 which swings around the drive shaft 106; a sticking part 110 attached to the tip of the arm part 108 through a second drive unit 109 to stick (or adhere) to a page P of the book B; a seating part 111 which supports the first drive unit 107, the arm part 108, and the sticking part 110; and a blower 112 which lets air pass above a page P before being turned to wind a page P after being turned. Each of the first drive unit 107 and the second drive unit 109 is, for example, a motor.

Figure 2:
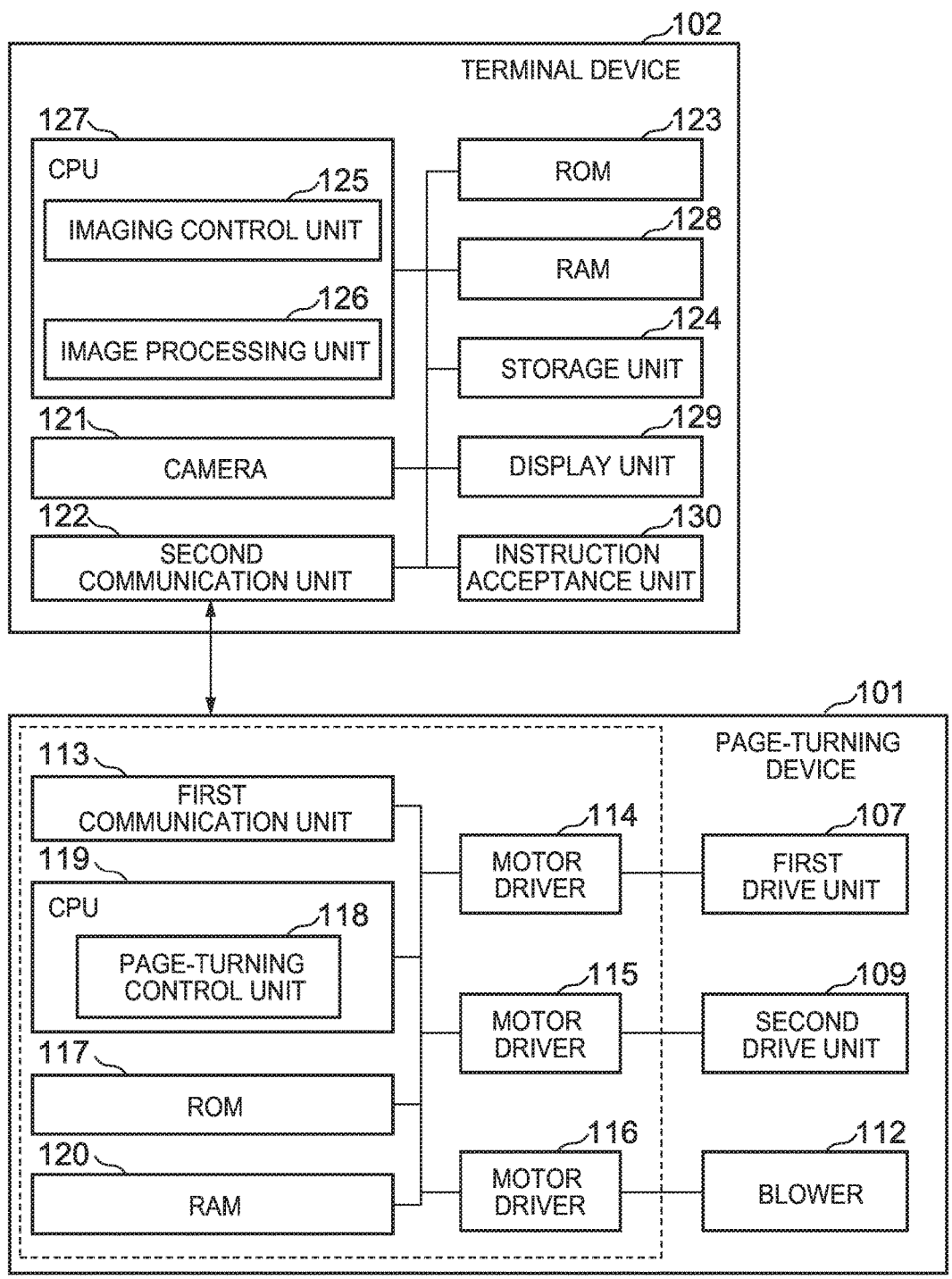
FIG. 2 is a block diagram showing the functional configuration of the image processing system according to Embodiment 1.

Further, as shown in FIG. 2, the page-turning device 101 includes, inside the storage case 105: a first communication unit 113 as an interface for communication with the terminal device 102; motor drivers 114, 115, and 116 which drive the first drive unit 107, the second drive unit 109, and the blower 112, respectively; a ROM (Read Only Memory) 117 in which various programs are stored; a CPU (Central Processing Unit) 119 which executes a program stored in the ROM 117 to fulfill a function as a page-turning control unit 118; and a RAM (Random Access Memory) 120 functioning as a working area of the CPU 119 upon execution of a program stored in the ROM.

The holding stand 103 holds the book B in such a manner that a page P after being turned will be inclined to a nearly-flat page P before being turned. This inclination angle θ is, for example, 30 to 45 degrees.

When the direction of a camera 121 (see FIG. 2) of the terminal device 102 is adjusted by a user or the like so that the page P of book B held on the holding stand 103 can be imaged, the stand 104 holds the terminal device 102 at the position and posture. In the embodiment, the terminal device 102 is fixed to the stand 104 in such a manner that only the left page of two facing pages of the book B will be shot with the camera 121. Here, the right and left correspond to the right and left when the page-turning control unit 118 is seen from the front (a side where the book B is held), respectively.

When power is supplied from a power supply, not shown, the CPU 119 executes the program stored in the ROM 117 to fulfill the function as the page-turning control unit 118. The page-turning control unit 118 controls the motor drivers 114, 115 to turn a page P of the book B based on a user's instruction acquired through the first communication unit 113.

Specifically, when acquiring a page-turning instruction through the first communication unit 113, the page-turning control unit 118 turns a page P while having the motor driver 116 drive the blower 112 as follows.

First, the page-turning control unit 118 controls the first drive unit 107 to move the arm part 108 from right to left. This causes the sticking part 110 to stick to the page P before being turned (left page P).

Next, the page-turning control unit 118 controls the first drive unit 107 to move the arm part 108 from left to right. This causes the page P sticking to the sticking part 110 starts being turned.

Then, the page-turning control unit 118 controls the second drive unit 109 to rotate the sticking part 110 in a state where the first drive unit 107 remains driven. Since the sticking strength is changed by this rotation when the sticking part 110 is separated from the page P, the sticking part 110 can be separated from the page P securely.

After both the first drive unit 107 and the second drive unit 109 are driven for a predetermined time, the page-turning control unit 118 stops the first drive unit 107 and the second drive unit 109. At this time, since the wind from the blower 112 can prevent the page P after being turned from returning to the original position, the sticking part 110 is separated from the page P in the turned state of the page P. Thus, the page P is turned, and the page-turning control unit 118 finishes the operation of turning the page P.

The page-turning device 101 described here substantially corresponds to a technique that configures a device disclosed in Japanese Patent Application Laid-Open Publication No. 2015-003446 to communicate with the terminal device 102. Note that the page-turning device 101 has only to be such a device to turn pages P of the book B, and it is not limited to the device having the configuration described here.

The terminal device 102 integrally has a function as an imaging device which images a page P when the page-turning device 101 turns to the page P to be imaged, and a function as an image processing apparatus which performs image processing on the captured image as a processing target image.

As shown in FIG. 2, the terminal device 102 includes: a second communication unit 122 as an interface for communication with the page-turning device 101; the camera 121 which images pages P of the book B; a ROM 123 in which various programs are stored; a storage unit 124 in which various programs, data indicative of images captured with the camera 121, and the like are stored; a CPU 127 which appropriately executes a program stored in the ROM 123 or the storage unit 124 to function as an imaging control unit 125 and an image processing unit 126; a RAM 128 functioning as a working area of the CPU 127 upon execution of a program stored in the ROM 123; a display unit 129 such as a liquid crystal device which displays captured images, images after being subjected to image processing, and the like; and an instruction acceptance unit 130 which accepts an instruction input based on a user's operation.

In the embodiment, a touch panel is configured by the display unit 129 and the instruction acceptance unit 130. IN other words, the display unit 129 displays a screen including buttons and the like to be operated by the user, and the instruction acceptance unit 130 accepts a user's operation according to the screen on the display unit 129. The instruction acceptance unit 130 may be a keyboard, a button, a pointing device, or the like.

The function of the imaging device is realized, for example, by the second communication unit 122, the camera 121, the CPU 127 functioning as the imaging control unit 125, the ROM 123 read or written by the CPU 127 functioning as the imaging control unit 125, the storage unit 124 and the RAM 128, the display unit 129 which displays captured images and the like, and the instruction acceptance unit 130 which accepts an imaging instruction and the like.

The function of the image processing apparatus is realized, for example, by the CPU 127 functioning as the image processing unit 126, the ROM 123 read or written by the CPU 127 functioning as the image processing unit 126, the storage unit 124 and the RAM 128, the display unit 129 which displays images after being subjected to image processing and the like, and the instruction acceptance unit 130 which accepts an instruction for image processing and the like.

Specifically, for example, the camera 121 is composed of a lens, a solid-state imaging device, and the like. Examples of the solid-state imaging device can include a CCD (Charge Coupled Device) image sensor and a CMOS (Complementary Metal Oxide Semiconductor) image sensor.

Figure 3:
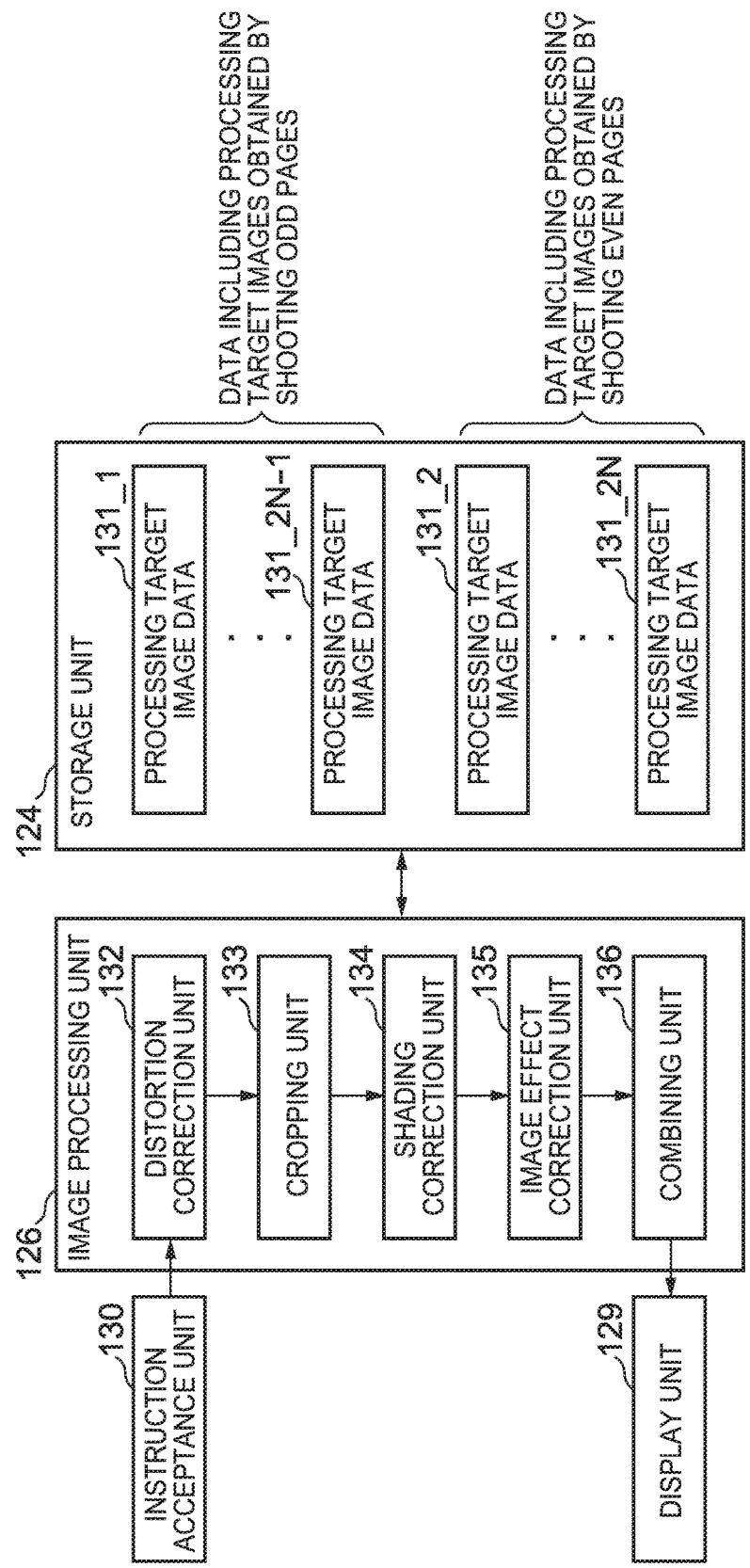
FIG. 3 is a block diagram showing a functional configuration included as an image processing apparatus in a terminal device according to Embodiment 1.

The storage unit 124 is a flash memory or the like. For example, as shown in FIG. 3, multiple pieces of processing target image data 131_1 to 2N are stored in the storage unit 124. Each piece of the processing target image data 131_1 to 2N denotes a processing target image i (where i is an integer of 1 to 2N) obtained by imaging each page P while opening the book B. Processing target image data 131_i denotes an image of the i-th page of the book B shot with the camera 121 immediately after the shooting, and after that, an image after image processing is performed on the image. In other words, the processing target image i obtained by imaging includes not only the shot image itself but also the image after being subjected to image processing.

As shown in FIG. 2, the imaging control unit 125 communicates with the page-turning device 101 through the second communication unit 122 to operate the camera 121 in synchronization with the operation of the page-turning device 101 to turn a page P. Thus, respective pages P turned by the page-turning device 101 are imaged in order. The imaging control unit 125 stores, in the storage unit 124, data indicative of images captured with the camera 121.

When accepting a user's instruction through the instruction acceptance unit 130, the image processing unit 126 performs image processing on processing target images of odd pages indicated by processing target image data 131_1, 3, . . . , 2N–3, 2N–1 or processing target images of even pages indicated by processing target image data 131_2, 4, . . . , 2N–2, 2N.

More specifically, as shown in FIG. 3, the image processing unit 126 has: a distortion correction unit 132 which performs distortion correction on a processing target image; a cropping unit 133 which crops a predetermined range from the processing target image after being subjected to the distortion correction; a shading correction unit 134 which performs shading correction on the cropped processing target image; an image effect correction unit 135 which performs predetermined image effect correction on the processing target image after being subjected to the shading correction; and a combining unit 136 which combines multiple processing target images.

When an image processing starting instruction based on a user's operation is accepted through the instruction acceptance unit 130, the distortion correction unit 132 corrects the distortion of a processing target image.

The cropping unit 133 crops a predetermined range from the processing target image the distortion of which is corrected by the distortion correction unit 132. Thus, for example, a shadow or the like on the page P of the book B projected on the image upon shooting is removed.

The shading correction unit 134 performs shading correction on the processing target image cropped by the cropping unit 133. The shading correction means to correct luminance unevenness so as to make the overall luminance of the processing target image uniform.

Figure 4:
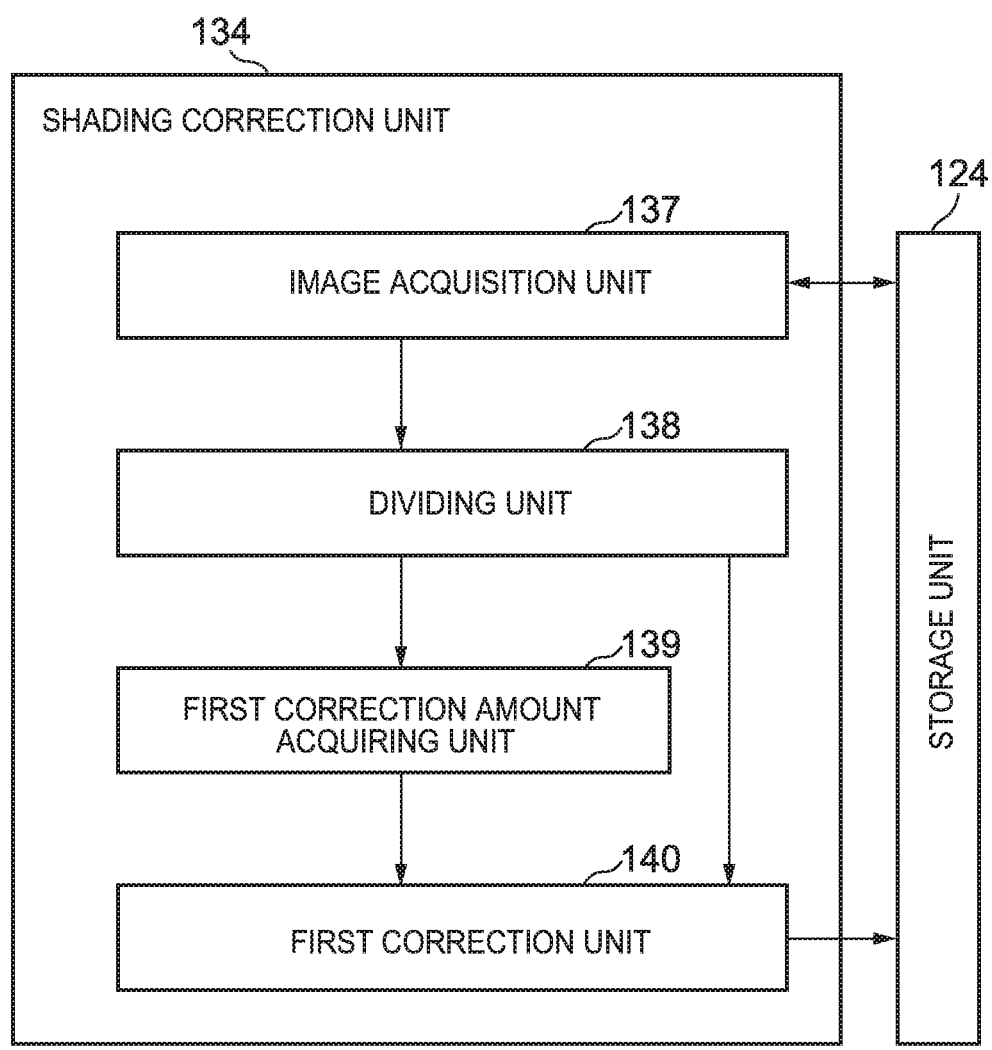
FIG. 4 is a block diagram showing the functional configuration of a shading correction unit according to Embodiment 1.

More specifically, as shown in FIG. 4, the shading correction unit 134 has: an image acquisition unit 137 which acquires each of multiple processing target images cropped by the cropping unit 133; a dividing unit 138 which divides each of the processing target images acquired by the image acquisition unit 137 into predetermined blocks; a first correction amount acquiring unit 139 which sets one of the multiple processing target images as a first image to acquire a first luminance correction amount Yab_1 of each block obtained by dividing this first image; and a first correction unit 140 which corrects the luminance of each pixel in the multiple processing target images based on the first luminance correction amount Yab_1 of each block.

When receiving an instruction from the cropping unit 133, the image acquisition unit 137 acquires, from the storage unit 124, the processing target image data 131_1 to 2N-1 (or the processing target image data 131_2 to 2N) indicating respective pages of the multiple processing target images. The processing target image data 131 acquired here are data stored in the storage unit 124 by the cropping unit 133 and indicative of the cropped processing target images. Thus, the image acquisition unit 137 acquires multiple processing target images. Note that the image acquisition unit 137 may acquire the processing target image data 131 from the cropping unit 133.

The dividing unit 138 divides each of the multiple processing target images acquired by the image acquisition unit 137 into multiple blocks by a common method.

Figure 5:
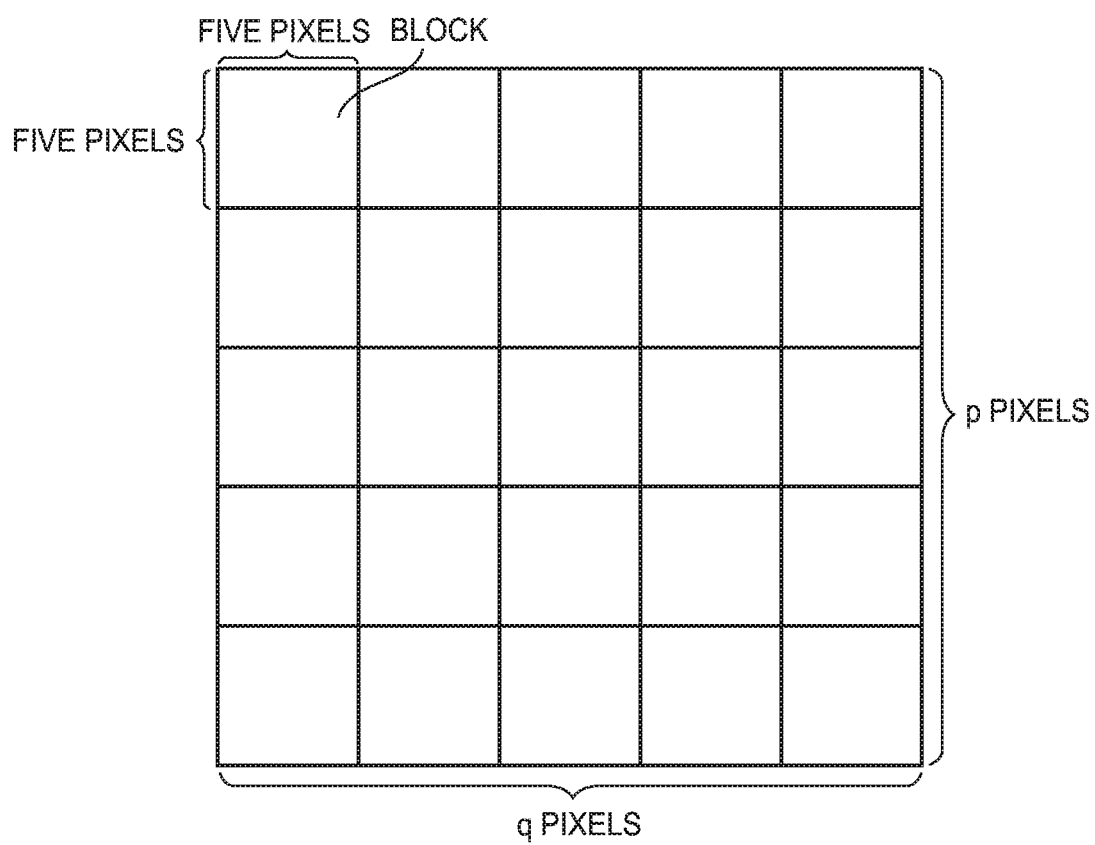
FIG. 5 is an illustration showing an example of multiple blocks obtained by dividing a processing target image.

Here, for example, when the number of pixels corresponding to a processing target image of the i-th page both in the horizontal and vertical directions is p×q as shown in FIG. 5, the dividing unit 138 divides the image into blocks of a predetermined size. As illustrated in FIG. 5, the blocks of the predetermined size are blocks each having 5×5 pixels in number in the horizontal and vertical directions, respectively. Since processing target images are thus divided, a block that covers the same area in the multiple processing target images is generated as a corresponding block among the multiple processing target images. In FIG. 5, the example of dividing a processing target image into five blocks in the horizontal and vertical directions, respectively, is shown.

The first correction amount acquiring unit 139 sets, as a first image, one processing target image specified by the user from among the multiple processing target images. Then, the first correction amount acquiring unit 139 acquires a first luminance correction amount Yab_1 of each block obtained by dividing the first image to make the overall luminance of the first image uniform.

In the embodiment, information on which of the multiple processing target images is to be set as the first image is included in an instruction accepted by the instruction acceptance unit 130 based on a user's operation. For example, the instruction for specifying the first image from among the multiple processing target images is included in the image processing starting instruction acquired by the distortion correction unit 132. In other words, the instruction acceptance unit 130 that accepts the instruction for specifying the first image corresponds to a first instruction acceptance unit which accepts an instruction for selecting at least one of the multiple processing target images.

Note that it is desired that the first image should be an image of a page P without any color photo, color chart, and the like. For example, it is desired that an image of a page P in which the background is white corresponding to paper and including only black characters should be selected.

The first correction unit 140 corrects the luminance of each pixel in the multiple processing target images based on the first luminance correction amount Yab_1 of each block acquired by the first correction amount acquiring unit 139.

In the embodiment, the first correction unit 140 applies the first luminance correction amount Yab_1 common to corresponding blocks of all the processing target images to correct the luminance of each pixel in the multiple processing target images.

As shown in FIG. 3, the image effect correction unit 135 performs image effect correction on a processing target image after being subjected to shading correction by the shading correction unit 134. For example, the image effect correction means to correct the luminance, color, and the like of the processing target image. The contrast and overall brightness are corrected by correcting the luminance. The white balance is corrected by correcting the color. The white balance correction means that an area that should be originally white is approximated to white in a processing target image. For example, when a white area on a page P is yellowish in the processing target image, the area is connected to white.

The combining unit 136 creates one piece of data including multiple processing target images indicated by the processing target image data 131_1 to 2N to combine the multiple processing target images. For example, the combining unit 136 creates data in which processing target images corresponding to respective pages P of the book B are arranged in order of page number. This data are computerized data on the book B.

The configuration of the image processing system 100 according to Embodiment 1 of the present invention is described above. The operation of the image processing system 100 according to the embodiment will be described below.

<Imaging Processing>

Figure 6:
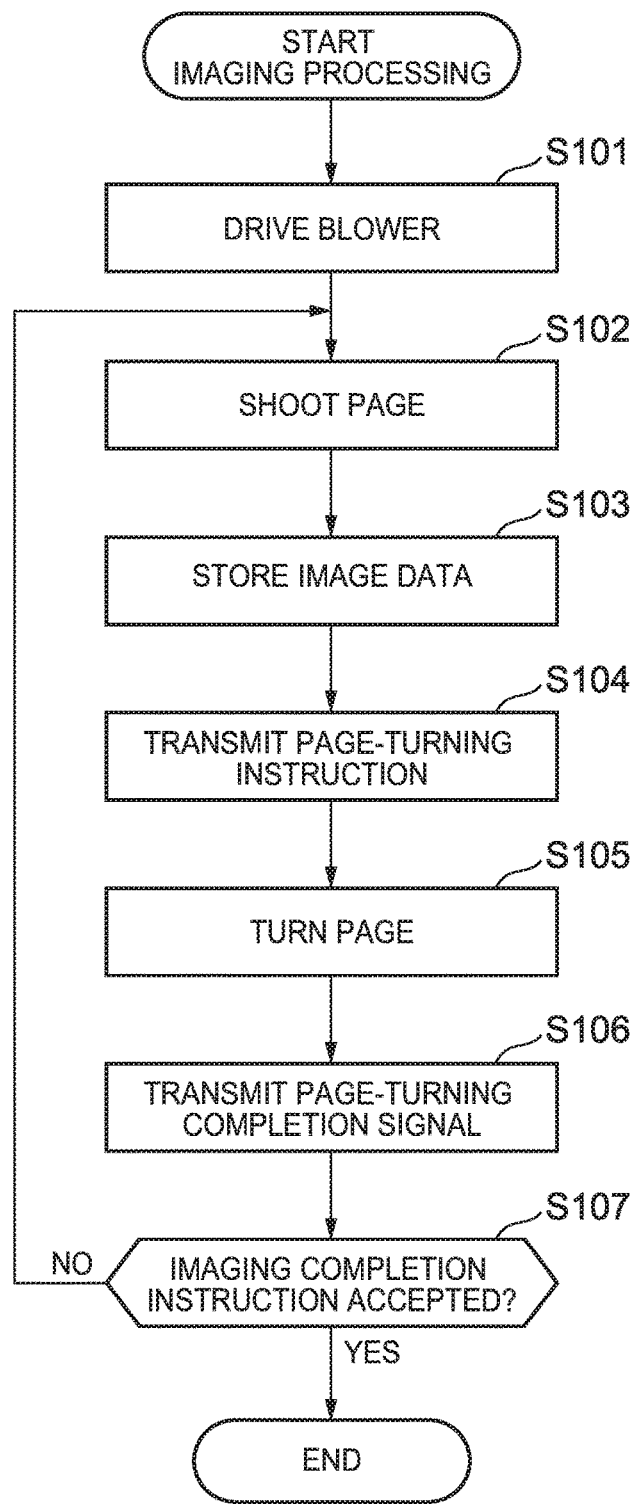
FIG. 6 is a flowchart showing a flow of imaging processing according to Embodiment 1.

The image processing system 100 performs imaging processing shown in FIG. 6. The imaging processing is processing for imaging each page P of the book B.

For example, when the instruction acceptance unit 130 accepts the imaging start instruction in response to a user's operation to the instruction acceptance unit 130, the terminal device 102 starts the imaging processing. Further, the page-turning device 101 acquires, through the first communication unit 113 and the second communication unit 122, the imaging start instruction accepted by the terminal device 102. Thus, the page-turning device 101 starts the imaging processing.

As mentioned above, only the left page of two facing pages of the book B is shot with the camera 121 in the embodiment. Here, it is assumed that the user performs an operation to instruct to start imaging after setting up the book B on the holding stand 103 to image odd pages.

Further, although the user may specify a page P of the book B to be imaged, it is assumed in the embodiment that all pages of the book B are imaged. Therefore, it is assumed that the first page, the third page, the fifth page, . . . , (2N-3)th page, and (2N-1)th page are first imaged.

In response to the imaging start instruction, the page-turning control unit 118 causes the motor driver 116 to drive the blower 112 (step S101). Thus, a page P after being turned is winded.

The camera 121 images a page P as the first page under the control of the imaging control unit 125 (step S102).

The imaging control unit 125 acquires, from the camera 121, processing target image data 131_1 indicative of the image captured at step S102 and stores the processing target image data 131_1 in the storage unit 124 (step S103).

The imaging control unit 125 transmits a page-turning instruction to the page-turning device 101 through the second communication unit 122 (step S104). The page-turning instruction is an instruction for causing the page-turning device 101 to turn the page P.

When acquiring the page-turning instruction through the first communication unit 113, the page-turning control unit 118 performs a series of control operations as mentioned above to turn the page P of the book B (step S105). Thus, since the page P of the book B is turned, the third page is open as a target of imaging with the camera 121.

The page-turning control unit 118 transmits a page-turning completion signal through the first communication unit 113 (step S106). The page-turning completion signal is a signal indicative of completion of the series of control operations for turning the page P.

Based on the signal from the instruction acceptance unit 130, the imaging control unit 125 determines whether to accept an imaging completion instruction based on a user's operation (step S107).

When it is determined that the imaging completion instruction is not accepted (No at step S107), the imaging control unit 125 and the page-turning control unit 118 repeat processing steps S102 to S106. Thus, odd pages P are imaged in the order of the third page, the fifth page, and so on, and processing target image data 131_3, 5, and so on respectively corresponding to the third page, the fifth page, and so on are stored in the storage unit 124.

When the operation of turning a page P is further started after the (2N−1)th page is opened, the user performs an operation to the instruction acceptance unit 130 to instruct the completion of imaging. Thus, since accepting the imaging completion instruction, the imaging control unit 125 determines that the imaging completion instruction is accepted (Yes at step S107), and notifies the page-turning device 101 through the second communication unit 122 of the imaging completion instruction to complete the imaging processing. The page-turning control unit 118 completes the imaging processing in response to the imaging completion instruction through the first communication unit 113. Thus, the processing target image data 131_1, 3, 5, . . . , 2N−3, 2N−1 corresponding to all the odd pages P of the book B are stored in the storage unit 124.

After that, the user sets up the book B on the holding stand 103 to image even pages P. Then, the user performs an operation to the instruction acceptance unit 130 to instruct the start of imaging. When the operation for turning a page P is further started after the 2N-th page is opened, the user performs an operation to the instruction acceptance unit 130 to instruct the completion of imaging. Thus, the processing target image data 131_2, 4, 6, . . . , 2N−2, 2N corresponding to the even pages P of the book B are stored in the storage unit 124. Combined with the previous imaging processing results, all the processing target image data 131_1 to 2N corresponding to all the pages P of the book B are stored in the storage unit 124 as shown in FIG. 3.

<Image Processing>

Figure 7:
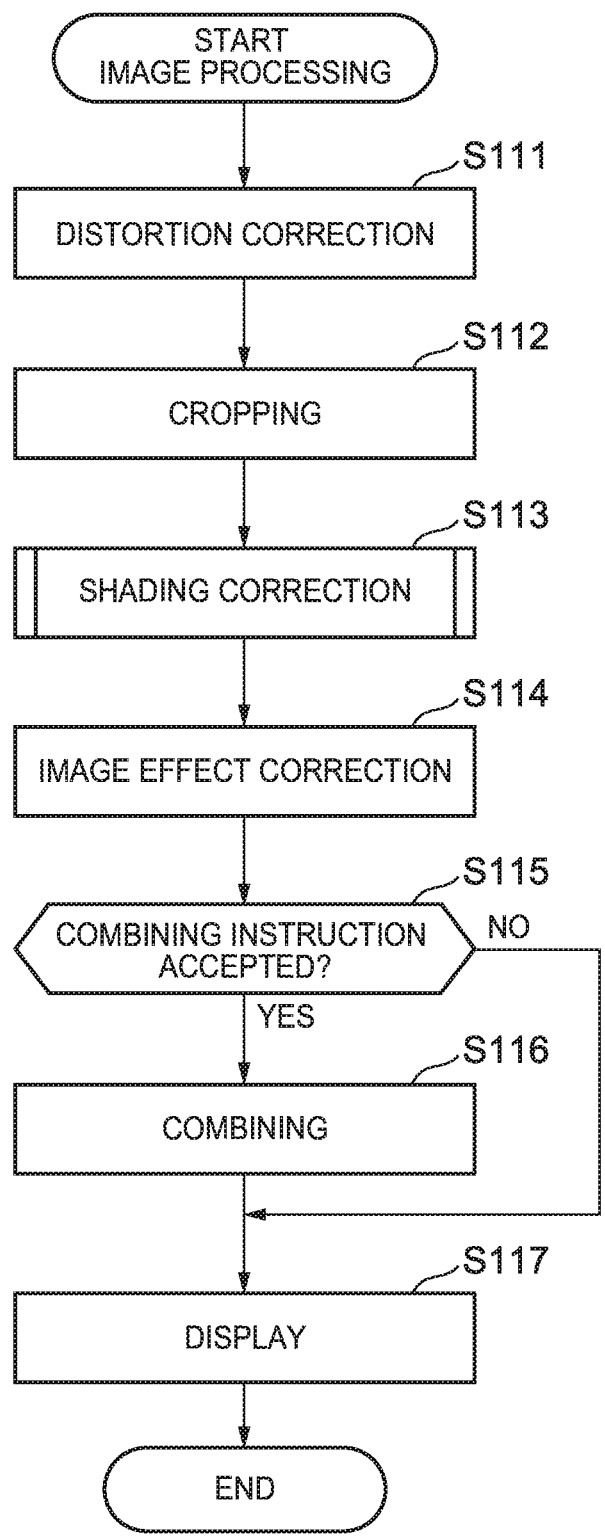
FIG. 7 is a flowchart showing a flow of image processing according to Embodiment 1.

The terminal device 102 performs, as an image processing apparatus, image processing on processing target images as shown in FIG. 7. The processing target images are images indicated by processing target image data stored in the storage unit 124.

In the embodiment, as mentioned above, the camera 121 is set up to image only one side of two facing pages. Therefore, for example, when both the odd pages P and the even pages P are imaged, there is a need to turn the book B relative to the page-turning device 101 in order to image the even pages after the completion of imaging the odd pages. This may vary the shooting conditions such as the way to apply light between the processing target images corresponding to the odd pages and the processing target images corresponding to the even pages.

Therefore, in the embodiment, it is assumed that the image processing is performed separately between the processing target images corresponding to the odd pages and the processing target images corresponding to the even pages. Here, it is assumed that the image processing is first performed on the processing target images corresponding to the odd pages in response to an image processing starting instruction including information for specifying the processing target images corresponding to the odd pages, the first image, and the like.

When the image processing starting instruction is accepted through the instruction acceptance unit 130, the distortion correction unit 132 acquires, from the storage unit 124, the processing target image data 1, 3, . . . , 2N−3, 2N−1. Then, the distortion correction unit 132 performs distortion correction on each of the processing target images indicated by the acquired processing target image data 1, 3, . . . , 2N−3, 2N−1, i.e., each of the processing target images corresponding to odd pages (step S111).

Specifically, when a page P of the book B is shot obliquely or the like, the shape of portions corresponding to the outer edges of the page P in the processing target image may shape a distorted quadrangle such as a trapezoid, rather than a rectangle.

The distortion correction unit 132 crops, from the processing target image, a rectangular area predetermined according to the angular field and shooting direction of the camera 121, and the like. Then, the distortion correction unit 132 performs projective transform of the cropped rectangle to generate a processing target image as if the page P has been shot from the front. The distortion correction unit 132 stores, in the storage unit 124, processing target image data 1, 3, . . . , 2N−3, 2N−1 indicative of generated processing target images.

The cropping unit 133 acquires the processing target image data 1, 3, . . . , 2N−3, 2N−1 from the storage unit 124. Then, the cropping unit 133 crops the predetermined range from each of the processing target images indicated by the acquired processing target image data 1, 3, . . . , 2N−3, 2N−1, i.e., each of the processing target images corresponding to odd pages corrected by the distortion correction unit 132 (step S112). The cropping unit 133 stores, in the storage unit 124, processing target image data 1, 3, . . . , 2N−3, 2N−1 indicative of the cropped processing target images.

The shading correction unit 134 acquires the processing target image data 1, 3, . . . , 2N−3, 2N−1 from the storage unit 124. Then, the shading correction unit 134 performs shading correction on each of the processing target images indicated by the acquired processing target image data 1, 3, . . . , 2N−3, 2N−1, i.e., each of the processing target images corresponding to odd pages cropped by the cropping unit 133 (step S113).

Figure 8:
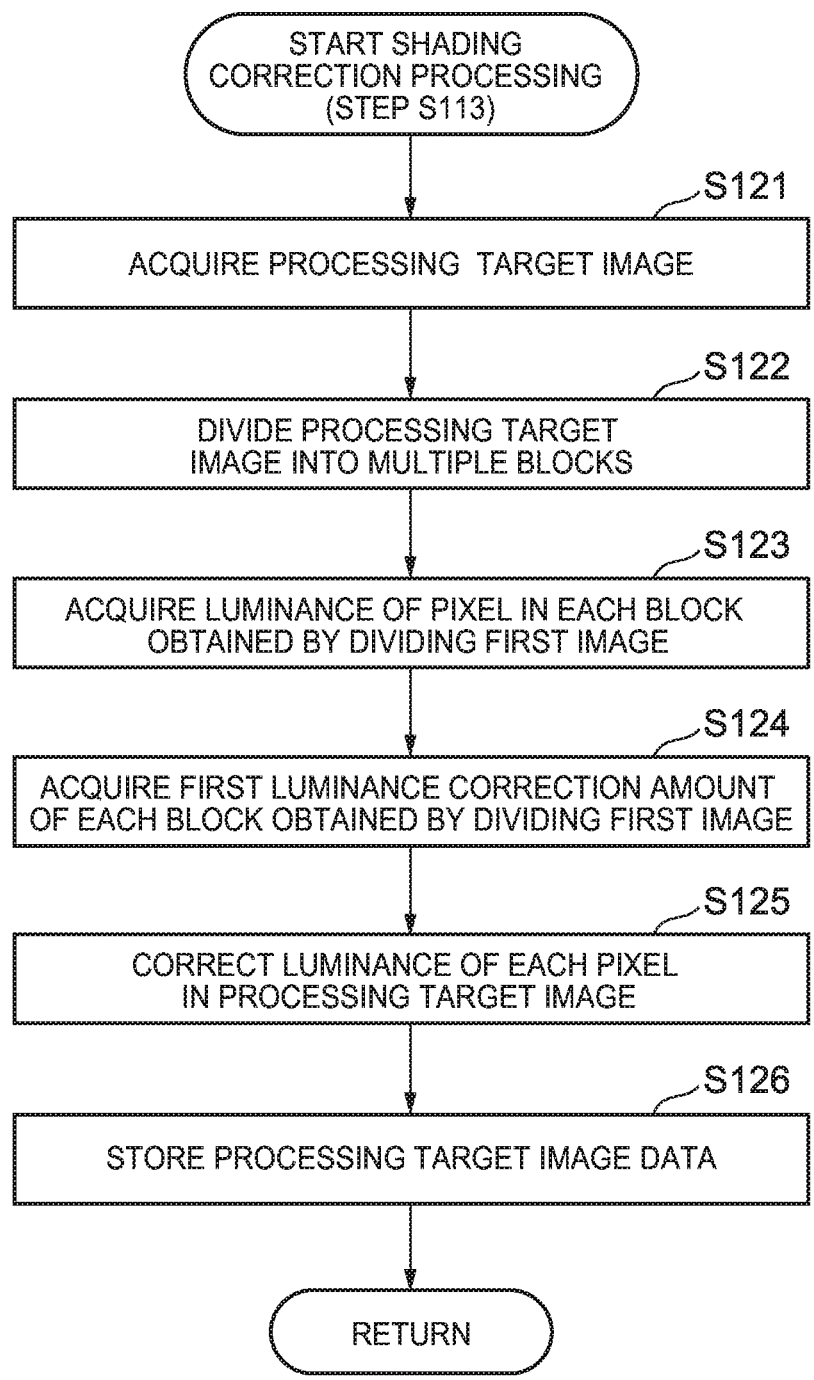
FIG. 8 is a flowchart showing a flow of shading correction processing according to Embodiment 1.

Here, the details of shading correction processing (step S113) are shown in FIG. 8.

When receiving, from the cropping unit 133, an instruction including information for specifying the first image, the image acquisition unit 137 acquires the processing target image data 1, 3, . . . , 2N−3, 2N−1 from the storage unit 124. Thus, the image acquisition unit 137 acquires the processing target images corresponding to odd pages cropped by the cropping unit 133 (step S121).

The dividing unit 138 divides each of the multiple processing target images acquired by the image acquisition unit 137 into common multiple blocks (step S122).

The first correction amount acquiring unit 139 specifies a processing target image as the first image based on information included in the image processing starting instruction acquired at step S121. The first correction amount acquiring unit 139 acquires the luminance Y of each pixel in each block obtained by dividing the first image at step S122 (step S123).

Here, the luminance Y of the pixel is, for example, calculated by $0.29891 \times R + 0.58661 \times G + 0.11448 \times B$. The R, G, and B are a red component pixel value, a green component pixel value, and a blue component pixel value, respectively, included in the pixel, which are values from 0 to 255.

Based on the luminance Y acquired at step S123, the first correction amount acquiring unit 139 acquires the first luminance correction amount Yab_1 of each block obtained by dividing the first image (step S124).

Specifically, the first correction amount acquiring unit 139 determines the frequency of occurrence of the luminance Y of each pixel in each block obtained by dividing the first image to specify a luminance Pab with the highest frequency. When the color of the pixel corresponding to the luminance Pab with the highest frequency is grayish color, it is considered to be a pixel corresponding to paper color as the background (e.g., white). Therefore, the first correction amount acquiring unit 139 sets, as the first luminance correction amount Yab_1, a value obtained by subtracting Pab from 255 in each block obtained by dividing the first image. Thus, the first luminance correction amount Yab_1 to make the pixel, corresponding to the luminance Pab with the highest frequency, white in each block obtained by dividing the first image can be acquired.

Here, when the upper left block shown in FIG. 5 is set as the original point (the block represented as 0 in both the horizontal and vertical directions), Pab represents the luminance of a block with the highest frequency as the a-th in the horizontal direction and the b-th block in the vertical direction, and Yab_1 represents the first luminance correction amount of the block as the a-th in the horizontal direction and the b-th in the vertical direction. In the embodiment, since each of the processing target images is divided as shown in FIG. 5, each of a and b is an integer of 0 to 4, respectively.

Figure 9:
FIG. 9 is an illustration showing an example of a first correction table.

Here, the first luminance correction amount Yab_1 of each block acquired by the first correction amount acquiring unit 139 may be created in a first correction table 141 as shown in FIG. 9 and stored in the storage unit 124 or the like accordingly.

Based on the first luminance correction amount Yab_1 of each block acquired at step S124, the first correction unit 140 corrects the luminance of each pixel in the multiple processing target images (step S125).

Specifically, the first correction unit 140 performs correction on the processing target image as the first image to add the first luminance correction amount Yab_1 to the luminance of each pixel in each block. In other words, the first luminance correction amount Yab_1 is added to the luminance of each of multiple pixels in the block as the a-th in the horizontal direction and the b-th in the vertical direction. Thus, the luminance unevenness of the processing target image as the first image is corrected.

Further, the first correction unit 140 adds the first luminance correction amount Yab_1 to the luminance of each pixel in each block of each processing target image other than the first image. In other words, Yab_1 is added to the luminance of each of multiple pixels in the block as the a-th in the horizontal direction and the b-th in the vertical direction. Thus, the luminance unevenness of each of the processing target images other than the first image is corrected. Thus, in the embodiment, the common first luminance correction amount Yab_1 is applied to blocks corresponding to all the processing target images to correct the luminance unevenness of the multiple processing target images.

The first correction unit 140 stores, in the storage unit 124, processing target image data 1, 3, . . . , 2N−3, 2N−1 indicative of the processing target images the luminance unevenness of which is corrected, respectively (step S126). Thus, the shading correction unit 134 ends the shading correction processing and returns to the image processing shown in FIG. 7.

FIG. 7 is referred to again.

The image effect correction unit 135 acquires the processing target image data 1, 3, . . . , 2N−3, 2N−1 from the storage unit 124. Then, the image effect correction unit 135 performs image effect correction on each of processing target images indicated by the acquired processing target image data 1, 3, . . . , 2N−3, 2N−1, i.e. each of the processing target images corresponding to odd pages corrected by the shading correction unit 134 (step S114). The image effect correction unit 135 stores, in the storage unit 124, processing target image data 1, 3, . . . , 2N−3, 2N−1 indicative of the processing target images after being subjected to the image effect correction. At this time, the processing target images may be compressed accordingly.

Based on whether the image processing starting instruction includes a combining instruction, the combining unit 136 determines whether the instruction acceptance unit 130 accepts the combining instruction (step S115).

When no combining instruction is included in the image processing starting instruction, the combining unit 136 determines that the instruction acceptance unit 130 has accepted no combining instruction (No at step S115). In this case, the display unit 129 acquires the processing target image data 1, 3, . . . , 2N−3, 2N−1 from the storage unit 124 to display the processing target images after being subjected to the image effect correction at step S114 (step S117). Thus, the image processing is ended.

When the combining instruction is included in the image processing starting instruction, the combining unit 136 determines that the instruction acceptance unit 130 has accepted the combining instruction (Yes at step S115). In this case, the combining unit 136 performs combining processing (step S116).

Specifically, the combining unit 136 creates data in which processing target images corresponding to respective pages P are arranged in order of page number, and stores the data in the storage unit 124.

The display unit 129 acquires the data created at step S116 from the storage unit 124 to display the processing target images arranged in order of page number (step S117). This causes the image processing to be ended.

Thus, the image processing for the processing target images corresponding to odd pages is ended.

Image processing for processing target images corresponding to even pages may be performed next. In this case, the combining instruction may be included in the image processing starting instruction.

When the image processing starting instruction is given, the processing from step S111 to S115 is also performed on processing target images corresponding to even pages. Then, when the combining instruction is included in the image processing starting instruction, the combining processing (step S116) is performed. The processing target images corresponding to odd pages previously processed are combined with the processing target images corresponding to even pages to create computerized data on the book B.

Embodiment 1 of the present invention is described above.

According to the embodiment, in the shading correction, the luminance of each pixel in the multiple processing target images is corrected based on the first luminance correction amount Yab_1 of each block obtained by dividing the first image among the multiple processing target images. Thus, image processing for multiple processing target images other than the first image to correct luminance unevenness can be reduced. This can reduce the processing load for correcting the luminance unevenness of the multiple processing target images captured while the book B is open.

Conventionally, since the shading correction is often performed based on white corresponding to paper color as the background, it is difficult to automate the shading correction of a processing target image corresponding to a page P including a color photo, a color chart, and the like. According to the embodiment, a processing target image including no color photo, no color chart, and the like is selected as the first image so that the luminance unevenness of a processing target image corresponding to a page P including a color photo, a color chart, and the like can be corrected appropriately.

Further, in the embodiment, the user can appropriately correct the luminance unevenness of multiple processing target images with a relatively simple operation to select the first image.

Further, in the embodiment, the processing target image that is subjected to luminance analysis (processing at steps S123 to S124) to acquire the luminance correction amount Yab is only the first image. Sine luminance analysis is not performed on the other processing target images, the possibility of detecting the luminance correction amount Yab by mistake can be reduced. Therefore, the luminance unevenness of multiple processing target images can be corrected appropriately.

The embodiment may be modified as follows.

For example, the example of applying the first luminance correction amount Yab_1 of each block obtained by dividing the first image as is to each block of each of processing target images other than the first image is described. However, the first luminance correction amount Yab_1 of each block obtained by dividing the first image may be applied to a table a relational expression, or the like prestored in the storage unit 124 to acquire the luminance correction amount Yab of each block for each of the processing target images other than the first image.

In general, when multiple pages P of the book B are imaged, it often happens that the unevenness of light irradiated from a lighting device L provided accordingly to illuminate each page P, the curvature of the page P, and the like gradually vary each time the page P is turned as shown in FIG. 10A, FIG. 10B, FIG. 11A, and FIG. 11B.

Figure 10A:
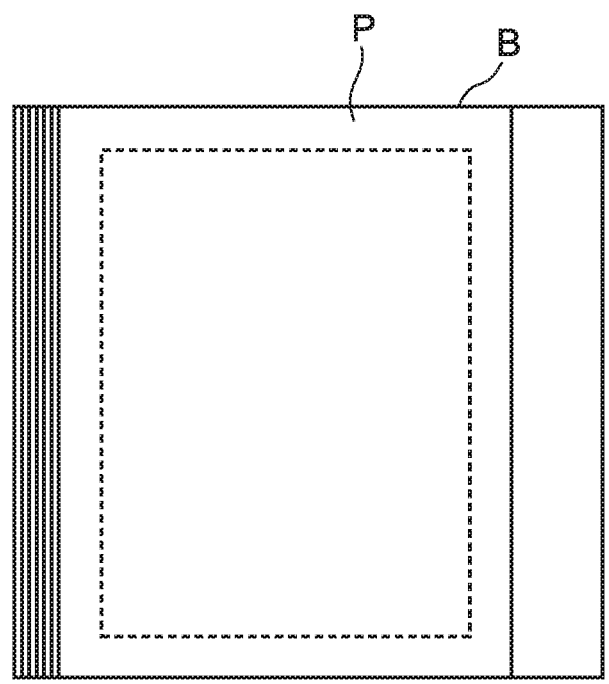
FIG. 10A is an illustration showing the unevenness of light when the first page of a book is shot.
Figure 10B:
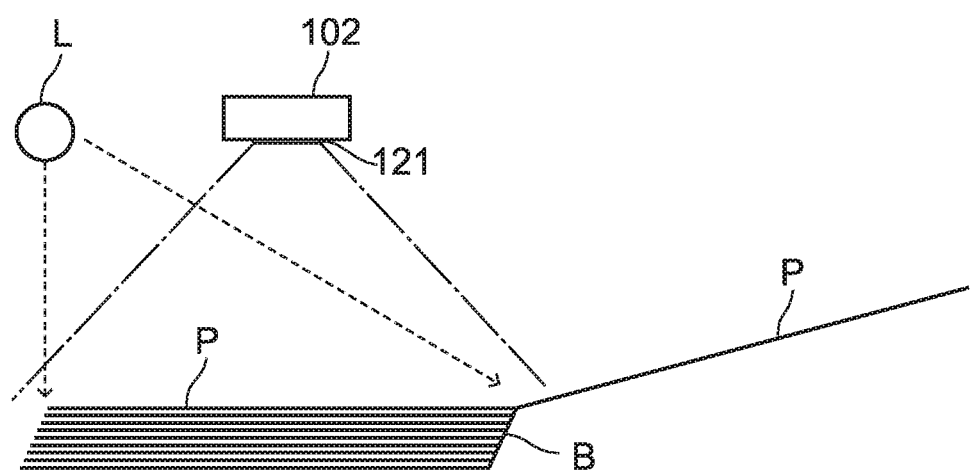
FIG. 10B is an illustration showing an example of the curvature of a page P when the first page of the book is shot.
Figure 11A:
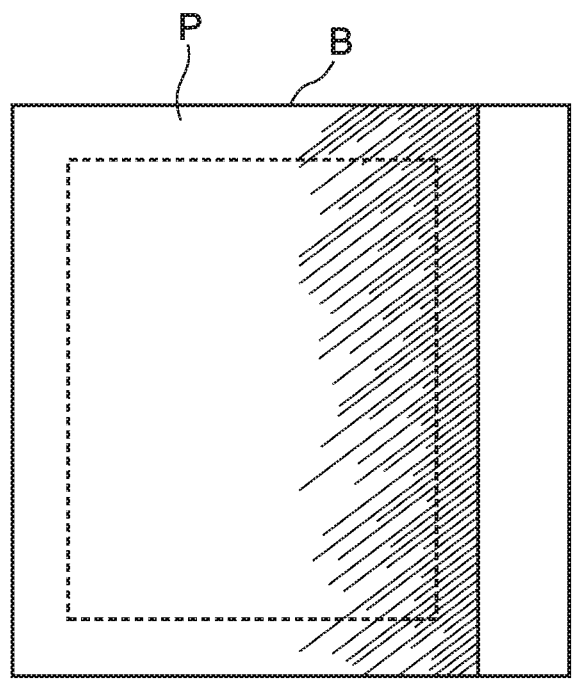
FIG. 11A is an illustration showing the unevenness of light when the (2N−1)th page of the book is shot.
Figure 11B:
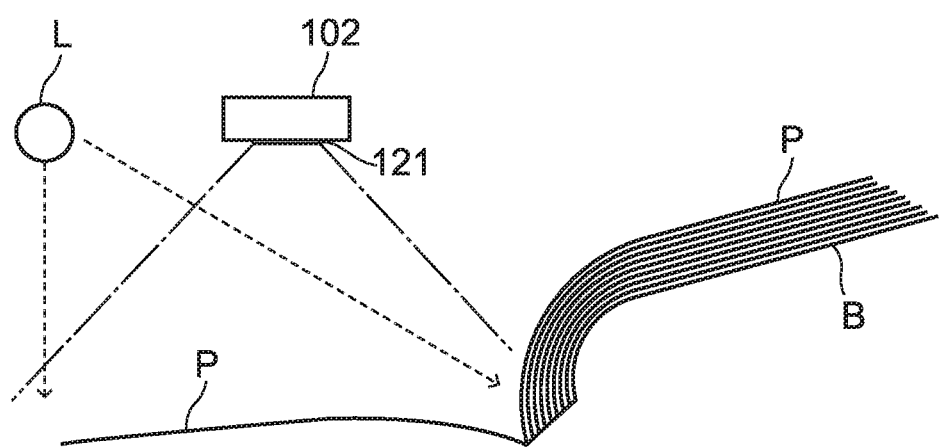
FIG. 11B is an illustration showing an example of the curvature of a page P when the (2N−1)th page of the book is shot.

FIG. 10A and FIG. 10B show an example of the unevenness of light during shooting the first page and the curvature of the page P. FIG. 11A and FIG. 11B show an example of the unevenness of light during shooting the (2N−1)th page and the curvature of the page P. As can be seen from FIG. 10B and FIG. 11B, the curvature of the first page is less than that of the (2N−1)th page. Further, as can be seen from FIG. 10A and FIG. 11A, the first page is lighted more uniformly than the (2N−1)th page.

As described above, the luminance correction amount Yab of each block is acquired for each of processing target images so that a more suitable luminance correction amount Yab of each block can be acquired for each of the processing target images. Thus, not only can the processing load for correcting the luminance unevenness of multiple processing target images captured while the book B is open reduced, but also the luminance unevenness can be corrected more suitably.

For example, the lighting device L which illuminates each page P is not limited to the lighting device provided accordingly to illuminate the page P. For example, an electric lamp, a lighting device provided for imaging in the terminal device 102 may be used.

For example, in the embodiment, the example where the first image is one of the multiple processing target images is described. However, two or more of the multiple processing target images may be selected as the first image. In this case, the first luminance correction amounts Yab_1 of each block obtained by dividing the first image can be acquired based on the luminance correction amounts Yab of each corresponding block between the processing target images selected as the first image. For example, an average value of luminance correction amounts Yab of respective corresponding blocks between the processing target images selected as the first image can be acquired as the first luminance correction amount Yab_1 of each block. Thus, two or more processing target images can be selected as the first image to acquire the first luminance correction amount Yab_1 more suitably. This can lead to not only a reduction in the processing load for correcting the luminance unevenness of multiple processing target images captured while the book B is open, but also more suitable correction of luminance unevenness.

For example, the page-turning device 101 may have an operation part operated by the user so that the page-turning device 101 and the terminal device 102 will start imaging processing in response to the operation.

For example, the page-turning device 101 and the terminal device 102 do not have to be communicably connected. In this case, since it is considered that the user gives an instruction to each of the devices 101 and 102 almost at the same time, and the time required for the page-turning device 101 to turn each page P is substantially constant, it is only necessary for the terminal device 102 to image the pages continuously at corresponding time intervals. Even in this case, the multiple pages P of the book B can be imaged. Although the user can turn the pages manually without using the page-turning device 101, the use of the page-turning device 101 can reduce the burden of the user.

For example, the display unit 129 may display each of the processing results accordingly. This allows the user to check the processing result. In this case, the instruction acceptance unit 130 can be configured to be able to modify a parameter applied to image processing accordingly with a user's operation as-needed basis. This enables more suitable correction. Thus, the processing target images can be processed to produce higher-quality images.

(Embodiment 2)

In the shading correction according to Embodiment 1, the description is made on the example where the luminance of each pixel in the multiple processing target images is corrected based on the first luminance correction amount Yab_1 of each block obtained by dividing the first image.

However, as described in the modifications of Embodiment 1, when multiple pages P of the book B are imaged, it often happens that the unevenness of light illuminated on each page P, the curvature of the page P, and the like gradually vary each time the page is turned.

In the embodiment, in order to acquire a suitable luminance correction amount Yab according to such changes in shooting conditions of each page P, description is made on an example where the luminance of each pixel in the multiple processing target images is corrected based on a first luminance correction amount Yab_1 and a second luminance correction amount Yab_2 of respective blocks obtained by dividing a first image and a second image, respectively.

Figure 12:
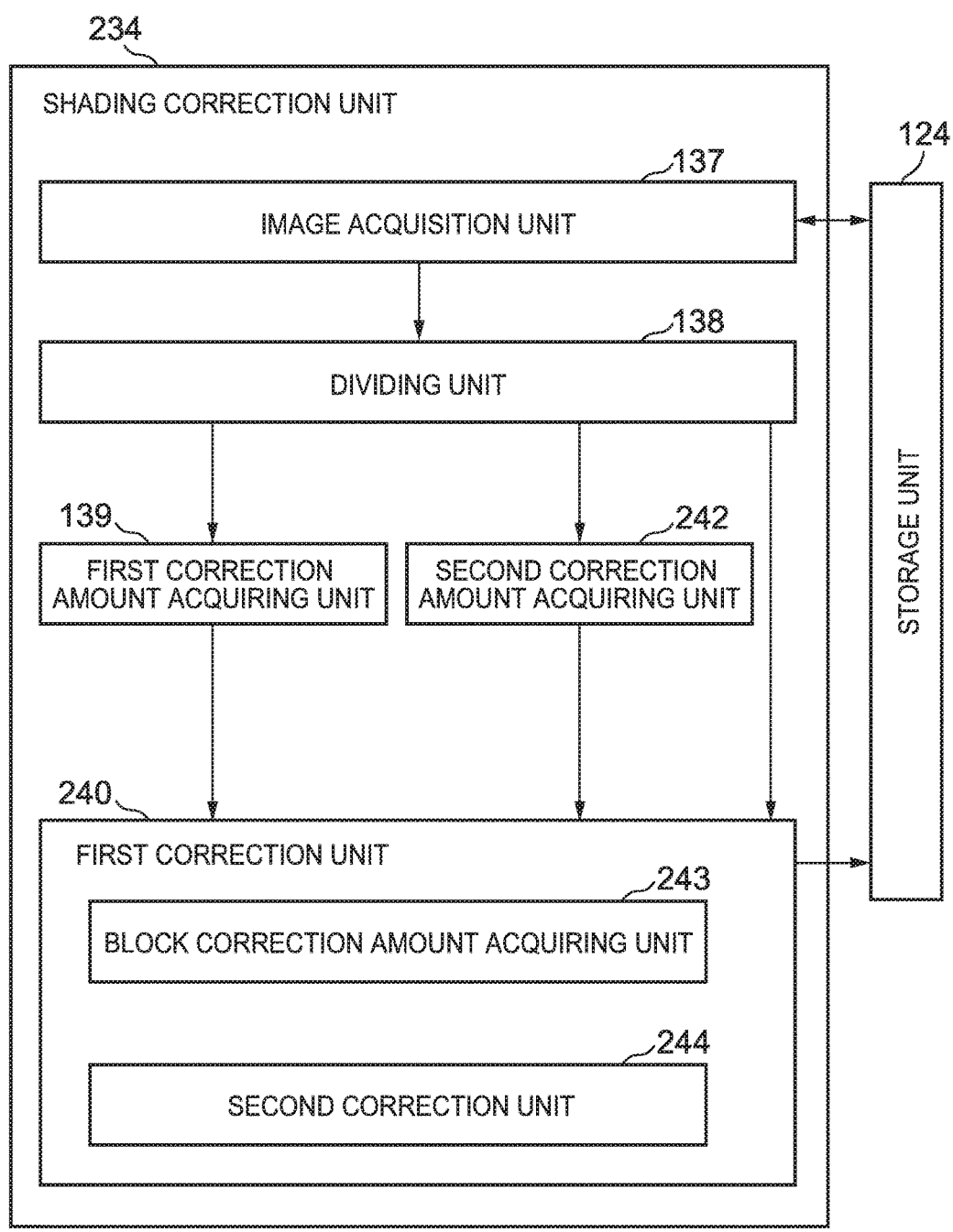
FIG. 12 is a block diagram showing the functional configuration of a shading correction unit according to Embodiment 2 of the present invention.

A terminal device functioning as an image processing apparatus according to the embodiment includes a shading correction unit 234, the functional configuration of which is shown in FIG. 12, instead of the shading correction unit 134 included in the terminal device 102 functioning as the image processing apparatus according to Embodiment 1. Except for this point, the image processing system according to the embodiment is configured substantially in the same way as that of the image processing system 100 according to Embodiment 1.

Like the shading correction unit 134 according to Embodiment 1, the shading correction unit 234 according to the embodiment performs shading correction on a processing target image cropped by the cropping unit 133.

As shown in FIG. 12, the shading correction unit 234 according to the embodiment includes a first correction unit 240 instead of the first correction unit 140 included in the shading correction unit 134 according to Embodiment 1. Further, in addition to the configuration included in the shading correction unit 134 according to Embodiment 1, the shading correction unit 234 includes a second correction amount acquiring unit 242. Except for these points, the shading correction unit 234 is configured substantially in the same way as that of the shading correction unit 134 according to Embodiment 1.

The second correction amount acquiring unit 242 sets, as a second image, one processing target image among the multiple processing target images to acquire a second luminance correction amount $Yab\_2$ of each block obtained by dividing this second image. Such a function of the second correction amount acquiring unit 242 operates in a manner similar to the case where the first image and the first luminance correction amount $Yab\_1$ in the description of the function of the first correction amount acquiring unit 139 mentioned above are replaced by the second image and the second luminance correction amount $Yab\_2$, respectively. Here, the second image is a processing target image different from the first image.

In other words, the second correction amount acquiring unit 242 sets, as the second image, one processing target image specified by the user among the multiple processing target images. Then, the second correction amount acquiring unit 242 acquires the second luminance correction amount $Yab\_2$ of each block obtained by dividing the second image to make the overall luminance of the second image uniform.

In the embodiment, information on which of the multiple processing target images is set as the second image is included in an instruction accepted by the instruction acceptance unit 130 based on a user's operation. For example, the instruction for specifying the second image instruction for specifying the first image from among the multiple processing target images is included in the image processing starting instruction acquired by the distortion correction unit 132. In other words, the instruction acceptance unit 130 that accepts the instruction for specifying the second image corresponds to a second instruction acceptance unit which accepts an instruction for selecting at least one of the multiple processing target images.

Like the first image, it is desired that the second image should be an image of a page P without any color photo, color chart, and the like. For example, it is desired that an image of a page P in which the background is white corresponding to paper and including only black characters should be selected.

The first correction unit 240 corrects the luminance of each pixel in the multiple processing target images based on the first luminance correction amount $Yab\_1$ of each block and the second luminance correction amount $Yab\_2$ of each block.

As shown in FIG. 12, the first correction unit 240 has a block correction amount acquiring unit 243 and a second correction unit 244.

The block correction amount acquiring unit 243 acquires the luminance correction amount Yab of each block obtained by dividing each of the multiple processing target images based on the first luminance correction amount $Yab\_1$ of each block and the second luminance correction amount $Yab\_2$ of each block.

Specifically, the block correction amount acquiring unit 243 interpolates the first luminance correction amount $Yab\_1$ and the second luminance correction amount $Yab\_2$ of each corresponding block between the multiple processing target images according to which page of the book B is open to obtain each of the multiple processing target images. Thus, the block correction amount acquiring unit 243 acquires the luminance correction amount Yab of each block obtained by dividing each of the multiple processing target images. In the embodiment, a linear interpolation is used as the interpolation method for acquiring the luminance correction amount Yab of each block. The use of the linear interpolation can simplify the processing, but the interpolation method is not limited to the linear interpolation, and any one of various non-liner interpolation methods may be adopted.

The second correction unit 244 corrects the luminance of each pixel in the multiple processing target images based on the luminance correction amount Yab of each block obtained by dividing each of the multiple processing target images.

Specifically, the second correction unit 244 applies each of luminance correction amounts Yab acquired by the block correction amount acquiring unit 243 to a block of a corresponding processing target image. This processing is performed on all the blocks in the multiple processing target images to correct the luminance of each pixel in the multiple processing target images.

The configuration of the image processing system according to Embodiment 2 of the present invention is described above. The operation of the image processing system according to the embodiment will be described below.

Even in the embodiment, imaging processing similar to that in Embodiment 1 is performed. In the embodiment, image processing performed by the terminal device as the image processing apparatus is different from the image processing according to Embodiment 1.

Figure 13:
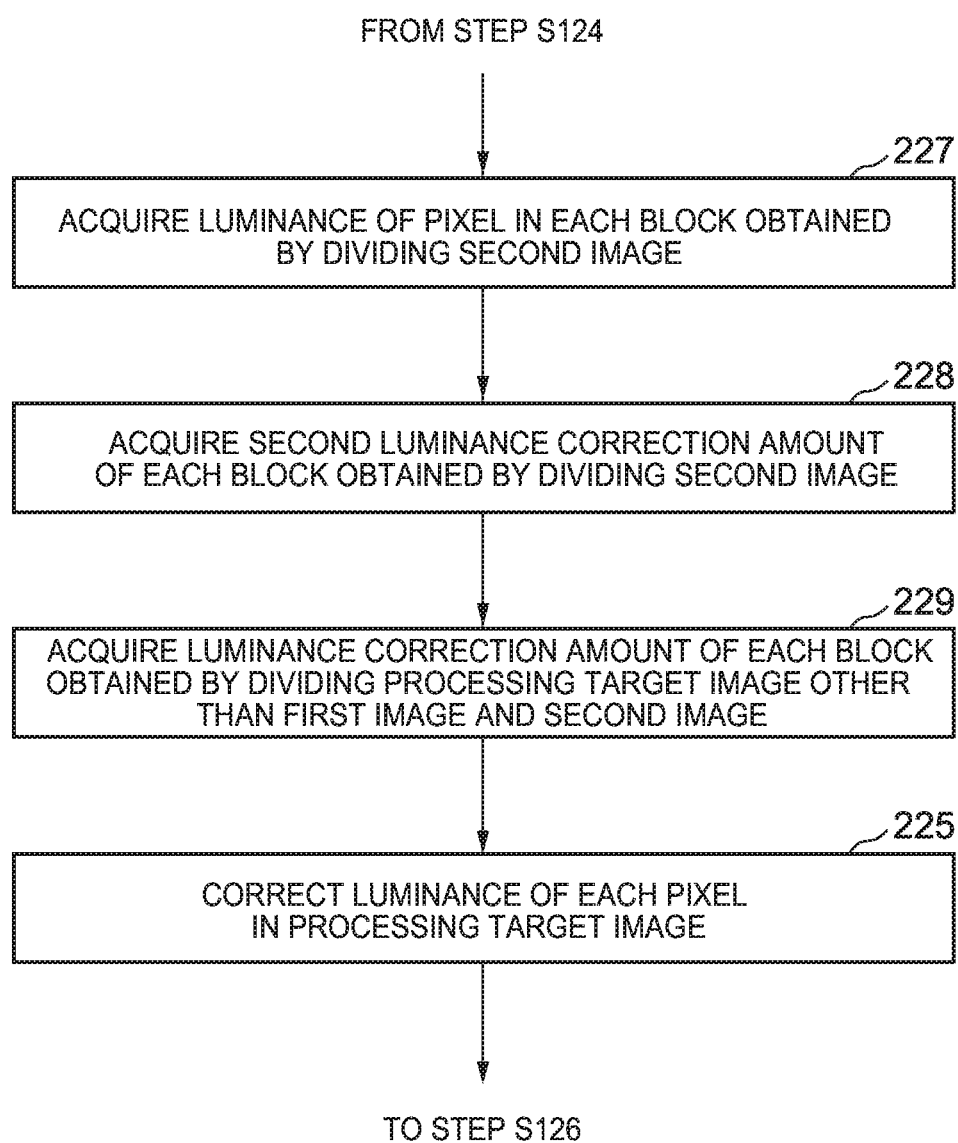
FIG. 13 is a flowchart showing a flow of shading correction processing according to Embodiment 2, indicating different points from the shading correction processing according to Embodiment 1.

Specifically, in the image processing according to the embodiment, processing step S225 is performed as shown in FIG. 13 instead of the processing step S125 among respective processing steps (step S121 to S126) included in the image processing according to Embodiment 1. Further, in the image processing according to the embodiment, processing steps S227 to S229 are performed between the processing step S124 and the processing step S225 in addition to respective processing steps included in the image processing according to Embodiment 1.

In the embodiment, description will be made by taking an example where image processing is performed on processing target images corresponding to odd pages. Note that the image processing can also be performed on processing target images corresponding to even pages in the same manner as the processing target images corresponding to odd pages.

When the processing step S124 is performed, the second correction amount acquiring unit 242 specifies a processing target image as the second image based on information included in the image processing starting instruction. At step S122, the second correction amount acquiring unit 242 acquires the luminance Y of each pixel in each block obtained by dividing the second image (step S227).

Based on the luminance Y acquired at step S227, the second correction amount acquiring unit 242 acquires the second luminance correction amount Yab_2 of each block obtained by dividing the second image (step S228).

Specifically, the second correction amount acquiring unit 242 acquires the second luminance correction amount Yab_2 of each block by the same method as the first correction amount acquiring unit 139. In other words, the second correction amount acquiring unit 242 determines the frequency of occurrence of the luminance Y of each pixel in each block obtained by dividing the second image to specify the luminance Pab with the highest frequency. The second correction amount acquiring unit 242 sets, as the second luminance correction amount Yab_2, a value obtained by subtracting Pab from 255 in each block obtained by dividing the second image. Thus, the second luminance correction amount Yab_2 to make the pixel, corresponding to the luminance Pab with the highest frequency, white in each block obtained by dividing the second image can be acquired. Here, Yab_2 represents the second luminance correction amount of a block as the a-th in the horizontal direction and the b-th in the vertical direction.

Here, the second luminance correction amount Yab_2 of each block acquired by the second correction amount acquiring unit 242 may be created as a second correction table similar to that of the first luminance correction amount Yab_1 illustrated in FIG. 9, and stored in the storage unit 124 or the like accordingly.

The block correction amount acquiring unit 243 performs linear interpolation between the first luminance correction amount Yab_1 and the second luminance correction amount Yab_2 to acquire the luminance correction amount Yab of each block for all the processing target images (step S229).

Specifically, for example, suppose that the first image is a processing target image corresponding to the e-th page and the second image is a processing target image corresponding to the f-th page. Suppose further that e and f are odd numbers of 1 or more and e<f. In this case, the luminance correction amount Yab of a block as the a-th in the horizontal direction and the b-th in the vertical direction in a processing target image on the k-th page is acquired by calculating $((f-k) \times Yab\_1 + (k-e) \times Yab\_2)/(f-e)$. Here, k is an odd number of 1 to 2N.

Here, in order to acquire, by interpolation, the luminance correction amount Yab_k gradually varying from page to page corresponding to the processing target images, it is desired to specify a processing target image corresponding to a page P close to the cover as the first image and a processing target image corresponding to a page P close to the back cover as the second image. Therefore, it is desired that e be 1 and f be 2N−1, i.e., that a processing target image corresponding to the first page be specified as the first image and a processing target image corresponding to the (2N−1)th page be specified as the second image.

However, when these pages include a color photo, a color chart, and the like, e can be a number other than 1 and f can be a number other than 2N−1.

For example, when e is a number other than 1, i.e., when the first image is a processing target image corresponding to a page other than the first page, the luminance correction amount Yab_1 of a corresponding block can be applied to each block of a processing target image corresponding to each of pages from the first page to the (e−2)th page. Further, for example, when f is a number other than 2N−1, i.e., when the second image is a processing target image corresponding to a page other than the (2N−1)th page, the luminance correction amount Yab_1 of a corresponding block can be applied to each block of a processing target image corresponding to each of pages from the (f+2)th page to the (2N−1)th page. Even in such a case, the luminance correction amount Yab may be acquired by interpolation (extrapolation).

Based on the luminance correction amounts Yab_1, Yab_2, and Yab of each block acquired at step S124, step S228, and step S229, the second correction unit 244 corrects the luminance of each pixel in multiple processing target images (step S225).

Specifically, the second correction unit 244 first adds the luminance correction amount Yab_1 to the luminance of each pixel in each block of the processing target image as the first image. In other words, the first luminance correction amount Yab_1 is added to the luminance of each of multiple pixels in a block as the a-th in the horizontal direction and the b-th in the vertical direction. Thus, the luminance unevenness of the processing target image as the first image is corrected.

Further, the second correction unit 244 corrects the luminance unevenness of the second image by the same method as the first image. Specifically, the second correction unit 244 adds the second luminance correction amount Yab_2 to the luminance of each pixel in each block of the processing target image as the second image. In other words, the second luminance correction amount Yab_2 is added to the luminance of each of multiple pixels in a block as the a-th in the horizontal direction and the b-th in the vertical direction. Thus, the luminance unevenness of the processing target image as the second image is corrected.

Further, the second correction unit 244 adds the luminance correction amount Yab of a corresponding block to the luminance of each pixel in each block of a processing target image other than the first image and the second image. This luminance correction amount Yab is acquired at step S229. In other words, the luminance correction amount Yab of the corresponding block is added to the luminance of each of the multiple pixels in a block as the a-th in the horizontal direction and the b-th in the vertical direction. Thus, the luminance unevenness of each processing target image other than the first image and the second image is corrected. In the embodiment, based on the first luminance correction amount Yab_1 and the second luminance correction amount Yab_2, the luminance correction amount Yab of each block for all the processing target images is acquired. Then, each luminance correction amount Yab is applied to the luminance of multiple pixels in a corresponding block to correct the luminance unevenness of the multiple processing target images.

The above describes Embodiment 2 of the present invention.

According to the embodiment, the luminance of each pixel in the multiple processing target images is corrected in the shading correction based on the first luminance correction amount Yab_1 and second luminance correction amount Yab_2 of each block obtained by dividing the first image and the second image among the multiple processing target images, respectively. Therefore, the image processing for correcting the luminance unevenness of multiple processing target images other than the first image and the second image can be reduced. Thus, like in Embodiment 1, the processing load for correcting the luminance unevenness of multiple processing target images captured while the book B is open can be reduced.

Further, according to the embodiment, processing target images including no color photo, color chart, and the like are selected as the first image and the second image so that the luminance unevenness of a processing target image corresponding to a page P including a color photo, a color chart, and the like can be corrected appropriately like in Embodiment 1.

Further, in the embodiment, the user can correct the luminance unevenness of multiple processing target images appropriately with relatively simple operations to select the first image and the second image.

Further, in the embodiment, the processing target images that are subjected to the luminance analysis (the processing steps S123 and S124 and the processing steps S227 and S228) to acquire the luminance correction amount Yab are only the first image and the second image. Since the other processing target images are not subjected to the luminance analysis, the possibility of detecting the luminance correction amount Yab by mistake can be reduced. Therefore, the luminance unevenness of multiple processing target images can be corrected appropriately like in Embodiment 1.

The embodiment may be modified as follows.

For example, the example of interpolating the first luminance correction amount Yab_1 and the second luminance correction amount Yab_2 to acquire the luminance correction amount Yab is described in the embodiment. However, the first luminance correction amount Yab_1 and the second luminance correction amount Yab_2 may be applied to a table, a relational expression, or the like prestored in the storage unit 124 to acquire the luminance correction amount Yab of each block for each of processing target images other than the first image and the second image. This also have the same effect as that in Embodiment 2.

For example, in the embodiment, the description is made on the example where the second image is one of the multiple processing target images. However, two or more of the multiple processing target images may be selected as second images. In this case, the second luminance correction amounts Yab_2 of respective blocks obtained by dividing the second images can be acquired based on the luminance correction amounts Yab of respective corresponding blocks between the processing target images selected as the second images. For example, an average value of the luminance correction amounts Yab of respective corresponding blocks between the processing target images selected as the second images can be acquired as the second luminance correction amount Yab_2 of each block. Thus, two or more processing target images can be selected as second images to acquire the second luminance correction amount Yab_2 more suitably. This can lead to not only a reduction in the processing load for correcting the luminance unevenness of multiple processing target images captured while the book B is open, but also more suitable correction of luminance unevenness.

(Embodiment 3)

In Embodiment 2, the description is made on the example where a common luminance correction amount Yab (or Yab_1 and Yab_2) is applied to each pixel in one block. However, according to this method, for example, the luminance of an area corresponding to the background may vary at the boundary between adjacent blocks, and hence the image may be difficult to see. In the embodiment, the luminance correction amount Yab of each block is interpolated to make the boundary between adjacent blocks less noticeable.

Figure 14:
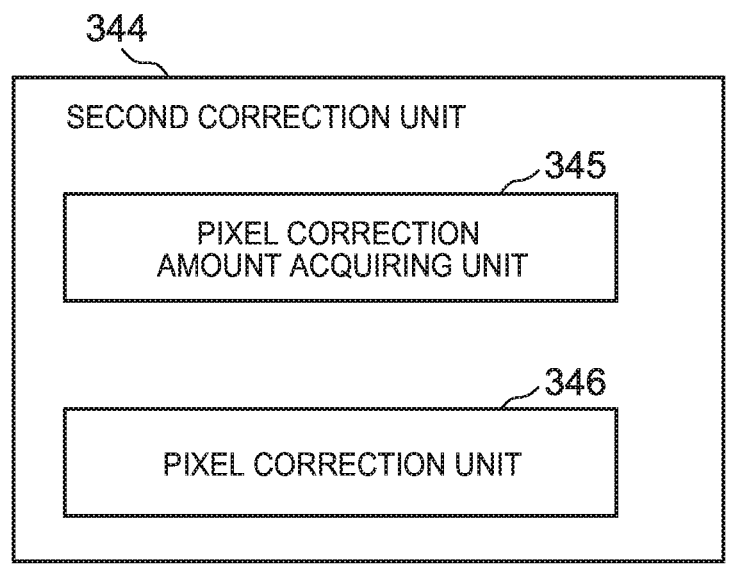
FIG. 14 is a block diagram showing the functional configuration of a second correction unit according to Embodiment 3 of the present invention.

An image processing apparatus according to the embodiment includes a second correction unit 344, the functional configuration of which is shown in FIG. 14, instead of the second correction unit 244 included in the image processing apparatus according to Embodiment 2. Except for this point, the image processing system according to the embodiment is configured substantially in the same way as that of the image processing system according to Embodiment 2.

Like the second correction unit 244 according to Embodiment 2, the second correction unit 344 corrects the luminance of each pixel in multiple processing target images based on the luminance correction amount Yab of each block obtained by dividing each of the multiple processing target images. The second correction unit 344 differs from the second correction unit 244 according to Embodiment 2 in that the second correction unit 344 acquires a luminance correction amount Pxy of each pixel in the multiple processing target images based on the luminance correction amount Yab of each block.

Specifically, the second correction unit 344 has a pixel correction amount acquiring unit 345 and a pixel correction unit 346 as shown in FIG. 14.

The pixel correction amount acquiring unit 345 acquires the luminance correction amount Pxy of each pixel in the multiple processing target images based on the luminance correction amount Yab of each block obtained by dividing each of the multiple processing target images.

Specifically, the pixel correction amount acquiring unit 345 interpolates the luminance correction amount Yab of each block according to the positional relationship of a representative pixel R predetermined in each block for each of the multiple processing target images to acquire the luminance correction amount Pxy of each pixel in the multiple processing target images.

In the embodiment, it is assumed that the representative pixel R is a pixel located at the center of each block. The pixel correction amount acquiring unit 345 specifies multiple representative pixels located around a pixel whose luminance correction amount Pxy is to be acquired. The pixel correction amount acquiring unit 345 interpolates the luminance correction amount Yab of each block to which each of the specified multiple representative pixels belongs to acquire the luminance correction amount Pxy of the pixel.

Further, in the embodiment, linear interpolation is adopted as the interpolation method for acquiring the luminance correction amount Pxy of each pixel. The processing can be simplified by adopting linear interpolation, but the interpolation method is not limited to linear interpolation, and any one of various non-linear interpolation methods may be adopted.

The pixel correction unit 346 corrects the luminance of each pixel in the multiple processing target images based on the luminance correction amount Pxy of each pixel in the multiple processing target images. The luminance correction amount Pxy of each pixel in the multiple processing target images is the luminance correction amount Pxy of each pixel acquired by the pixel correction amount acquiring unit 345.

The configuration of the image processing system according to Embodiment 3 of the present invention is described above. The operation of the image processing system according to the embodiment will be described below.

Even in the embodiment, imaging processing similar to that in Embodiment 2 is performed. In the embodiment, image processing according to the embodiment is performed by the terminal device as the image processing apparatus like in Embodiment 2. However, the configuration of processing included in the image processing according to the embodiment is different from that of the image processing according to Embodiment 2.

Figure 15:
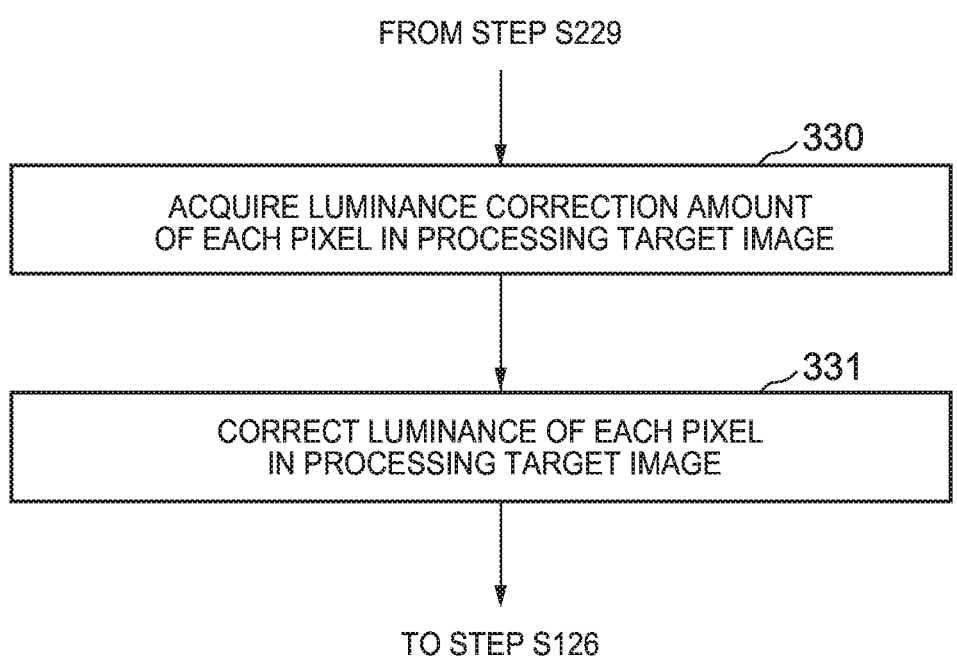
FIG. 15 is a flowchart showing a flow of shading correction processing according to Embodiment 3, indicating different points from the shading correction processing according to Embodiment 2.

Specifically, in the image processing according to the embodiment, processing steps S330 and S331 are performed as shown in FIG. 15 instead of the processing step S225 among respective processing steps (step S121 to S124, step S227 to S229, and step S225 and step S126) included in the image processing according to Embodiment 2.

In the embodiment, description will be made on an example where the image processing is performed on processing target images corresponding to odd pages. Note that the image processing can also be performed on processing target images corresponding to even pages in the same manner as the processing target images corresponding to odd pages.

The pixel correction amount acquiring unit 345 interpolates the luminance correction amount Yab of each block, to which each of representative pixels R in adjacent four blocks belongs, for each of the multiple processing target images to acquire the luminance correction amount Pxy of each pixel in a quadrangle having the representative pixels R as its vertices. The pixel correction amount acquiring unit 345 repeats this processing for all combinations of adjacent four blocks in all the processing target images to acquire the luminance correction amount Pxy of each pixel in all the processing target images (step S330).

Figure 16:
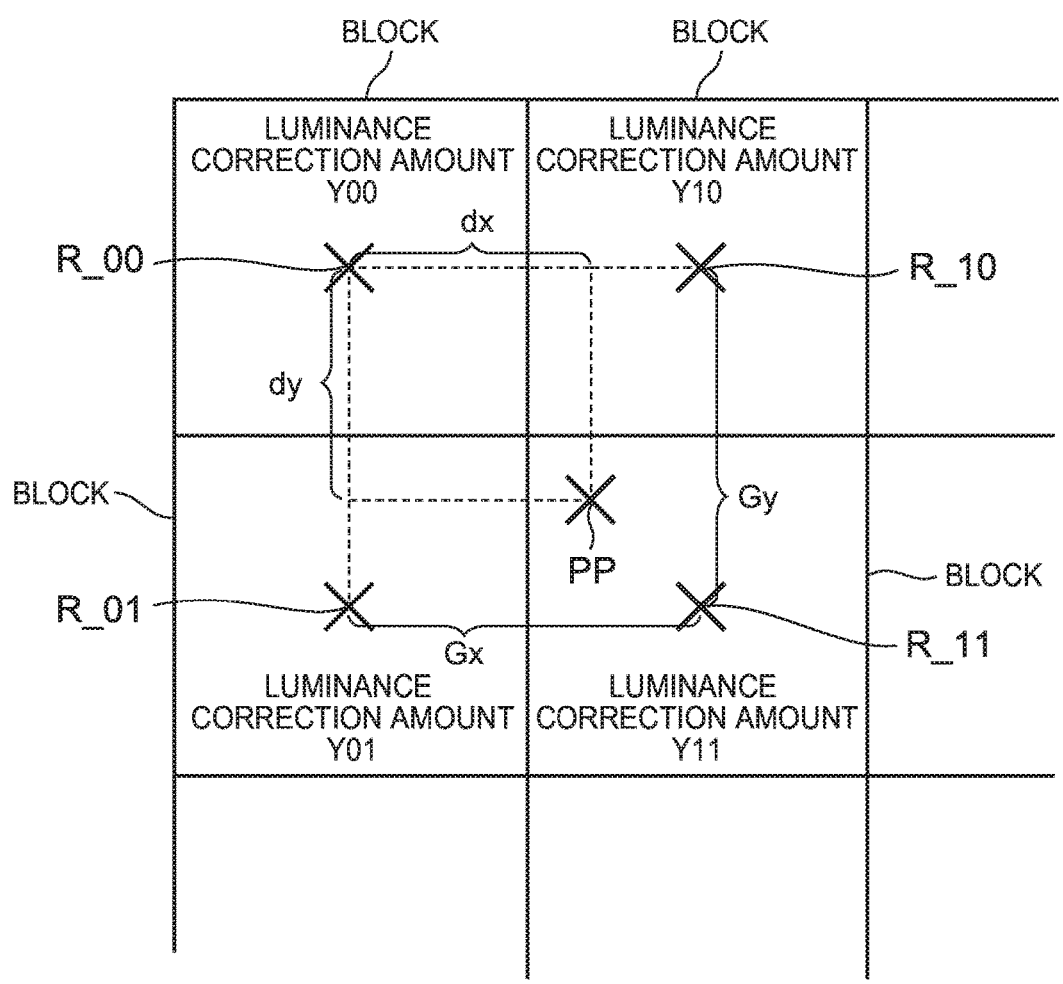
FIG. 16 is an illustration for describing a method of interpolating a luminance correction amount Yab of each block to acquire a luminance correction amount Pxy of each pixel in a processing target image.

Here, as shown in FIG. 16, an example of acquiring the luminance correction amount Pxy of a pixel PP belonging to an upper left area in a block as the first in the horizontal direction and the first in the vertical direction will be described. It is assumed that the luminance correction amount of each block, to which each of the representative pixel R_00, R_01, R_10, and R_11 located around the pixel PP belongs, is Y00, Y01, Y10, or Y11, respectively.

It is also assumed that both of the horizontal length of R_00 and R_10 and the horizontal length of R_01 and R_11 correspond to a length of Gx pixel. It is further assumed that both of the vertical length of R_00 and R_01 and the vertical length of R_10 and R_11 correspond to a length of Gy pixel.

Further, it is assumed that horizontal distance from a straight line connecting R_00 and R_01 to the pixel PP corresponds to a length of dx pixel, and that vertical distance from a straight line connecting R_00 and R_10 to the pixel PP corresponds to a length of dy pixel.

In this case, the luminance correction amount Pxy of the pixel PP is acquired by calculating C_y0×(1−dy/Gy)+C_y1× (dy/Gy). Here, it is set that C_y0=Y00×(1−dx/Gx)+Y10× (dx/Gx) and C_y1=Y01×(1−dx/Gx)+Y11×(dx/Gx).

The pixel correction unit 346 applies the luminance correction amount Pxy of each pixel acquired at step S330 to the luminance of a corresponding pixel to correct the luminance of each pixel in the processing target image (step S331). Specifically, the pixel correction unit 346 adds, to the luminance of the corresponding pixel, the luminance correction amount Pxy of each pixel acquired at step S330. Thus, the luminance of each pixel in all the processing target images is corrected.

Embodiment 3 of the present invention is described above.

According to the embodiment, the same effect as that of Embodiment 2 is obtained.

Further, according to the embodiment, the luminance correction amount Pxy of each pixel is acquired based on the luminance correction amount Yab of each block. This can lead to smooth interpolation to make the boundary between adjacent blocks less noticeable. Therefore, a high-quality image can be obtained.

The embodiment may be modified as follows.

In the embodiment, the description is made on the example of applying, to Embodiment 2, such a process that the luminance correction amount Pxy of each pixel is acquired based on the luminance correction amount Yab of each block. Such a process that the luminance correction amount Pxy of each pixel is acquired based on the luminance correction amount Yab of each block may also be applied to Embodiment 1.

In this case, for example, the luminance correction amount Pxy of each pixel can be acquired by the same interpolation as that in Embodiment 3 based on the luminance correction amount Yab_1 of each block in the first image. Then, the luminance correction amount Pxy of each pixel can be applied to each corresponding pixel in each of the processing target images. In other words, a corresponding luminance correction amount Pxy can be added to the luminance of each pixel in the processing target image. Even this can lead to smooth interpolation to make the boundary between adjacent blocks less noticeable, so that a high-quality image can be obtained.

(Embodiment 4)

In Embodiment 2, the description is made on the example where the first image and the second image are selected according to user's instructions. In the embodiment, description will be made on an example where the first image and the second image are selected by a terminal device. Note that the selection of the first image in the embodiment may also be applied to Embodiment 1.

Figure 17:
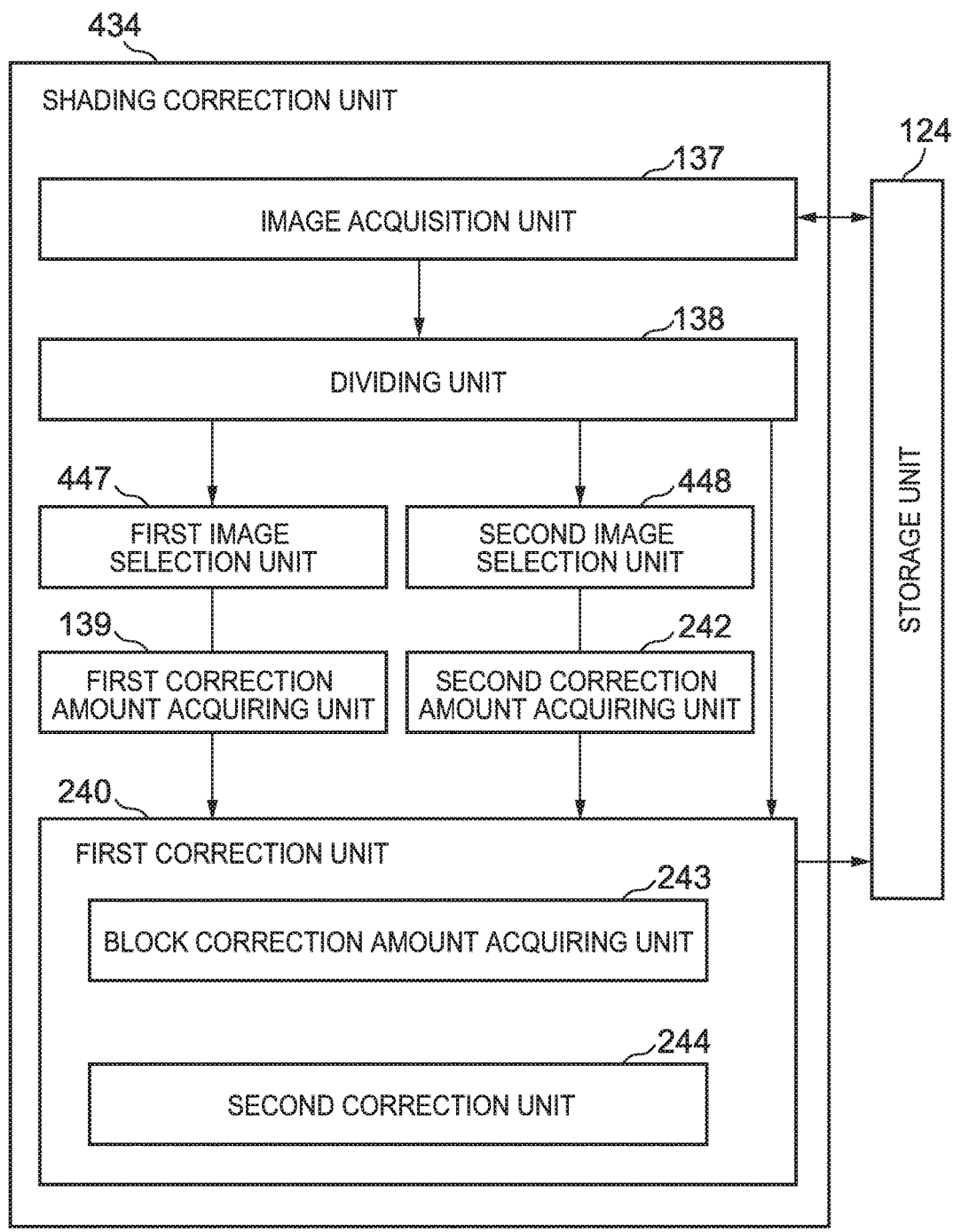
FIG. 17 is a block diagram showing the functional configuration of a shading correction unit according to Embodiment 4 of the present invention.

An image processing apparatus according to the embodiment includes a shading correction unit 434, the functional configuration of which is shown in FIG. 17, instead of the shading correction unit 234 included in the image processing apparatus according to Embodiment 2. Except for this point, the image processing system according to the embodiment is configured substantially in the same way as that of the image processing system according to Embodiment 2.

The shading correction unit 434 has a first image selection unit 447 which selects the first image from multiple processing target images, and a second image selection unit 448 which selects the second image from the multiple processing target images in addition to the configuration of the shading correction unit 234 according to Embodiment 2. Except for these points, the shading correction unit 434 according to the embodiment is configured substantially in the same way as that of the shading correction unit 234 according to Embodiment 2.

The first image selection unit 447 selects a predetermined number of processing target images as the first image based on the number of pixels that exhibit a color predetermined for each processing target image. Specifically, the first image selection unit 447 selects, as first image, a predetermined number of processing target images in order from a page P closest to the cover of the book B and open at the time of imaging based on the number of pixels that exhibit a color predetermined for each processing target image.

The second image selection unit 448 selects a predetermined number of processing target images as the second image based on the number of pixels that exhibit a color predetermined for each processing target image. Specifically, the second image selection unit 448 selects, as the second image, a predetermined number of processing target images in order from a page P closest to the back cover of the book B and open at the time of imaging based on the number of pixels that exhibit a color predetermined for each processing target image.

In the embodiment, white as the color corresponding to paper as the background and black as the color of characters are adopted as predetermined colors. Then, 1 is used as the predetermined number. Thus, one page with only characters on white paper can be automatically selected as each of the first image and the second image, respectively.

The configuration of the image processing system according to Embodiment 4 of the present invention is described above. The operation of the image processing system according to the embodiment will be described below.

Even in the embodiment, imaging processing similar to that in Embodiment 2 is performed. Image processing according to the embodiment is performed by the terminal device as the image processing apparatus like in Embodiment 2. However, the configuration of processing included in the image processing according to the embodiment is different from that of the image processing according to Embodiment 2.

Figure 18:
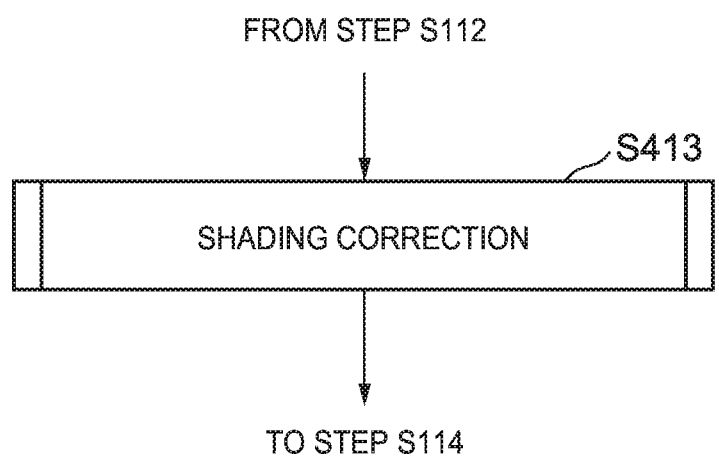
FIG. 18 is a flowchart showing a flow of image processing according to Embodiment 4, indicating different points from image correction processing according to Embodiment 2.

Specifically, the image processing according to the embodiment includes shading correction processing (step S413) as shown in FIG. 18 instead of the shading correction processing (step S113) included in the image processing according to Embodiment 2. Except for this point, the image processing according to the embodiment is substantially the same as that of the image processing according to Embodiment 2.

In the embodiment, description will be made on an example where the image processing is performed on processing target images corresponding to odd pages. Note that the image processing can also be performed on processing target images corresponding to even pages in the same manner as the processing target images corresponding to odd pages.

Figure 19A:
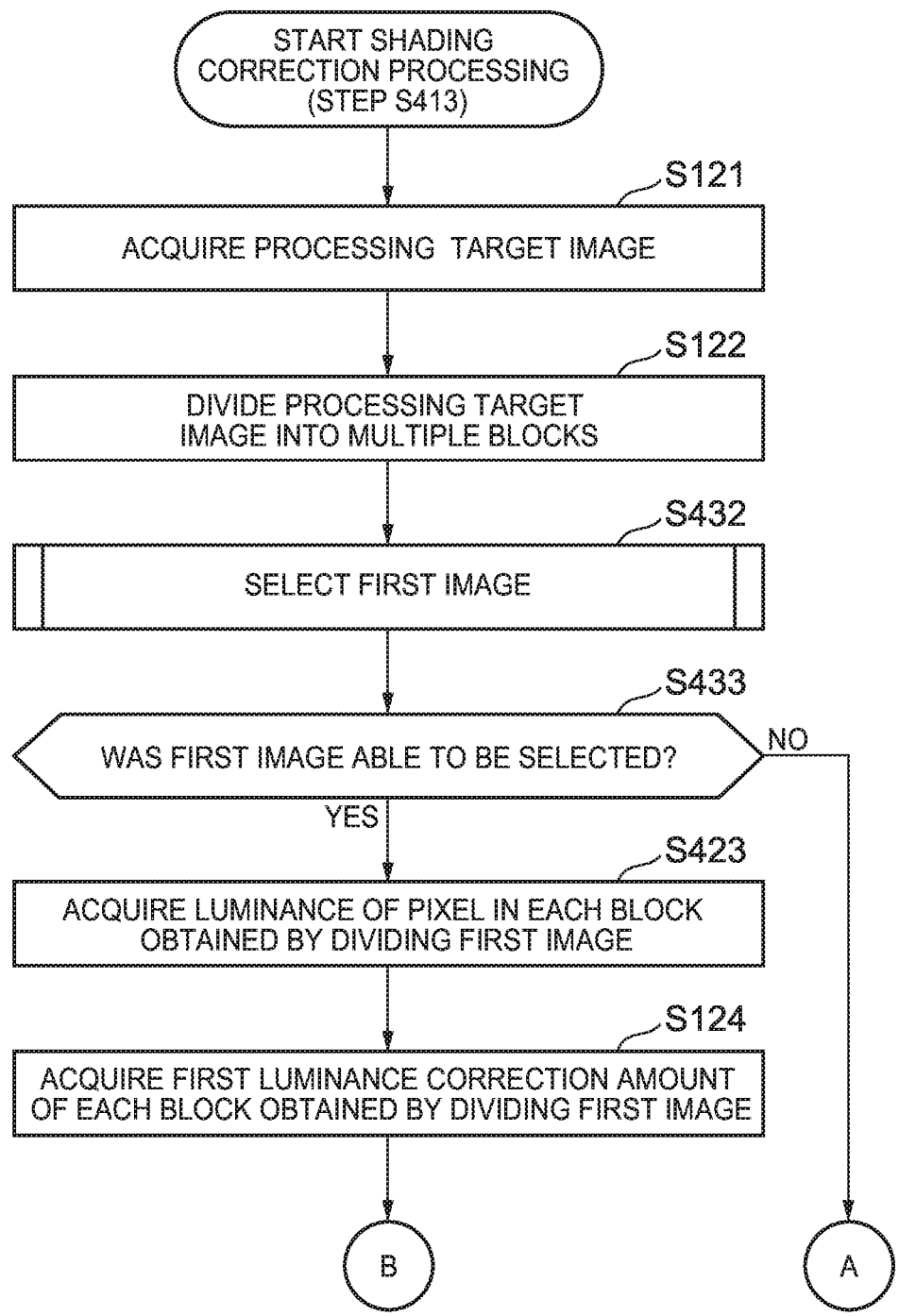
FIG. 19A and FIG. 19B are flowcharts showing a flow of shading correction processing according to Embodiment 4.

In the shading correction processing (step S413) according to the embodiment, processing steps S121 and S122 are performed as shown in FIG. 19A.

Subsequently, the first image selection unit 447 selects a first image (step S432).

Figure 20:
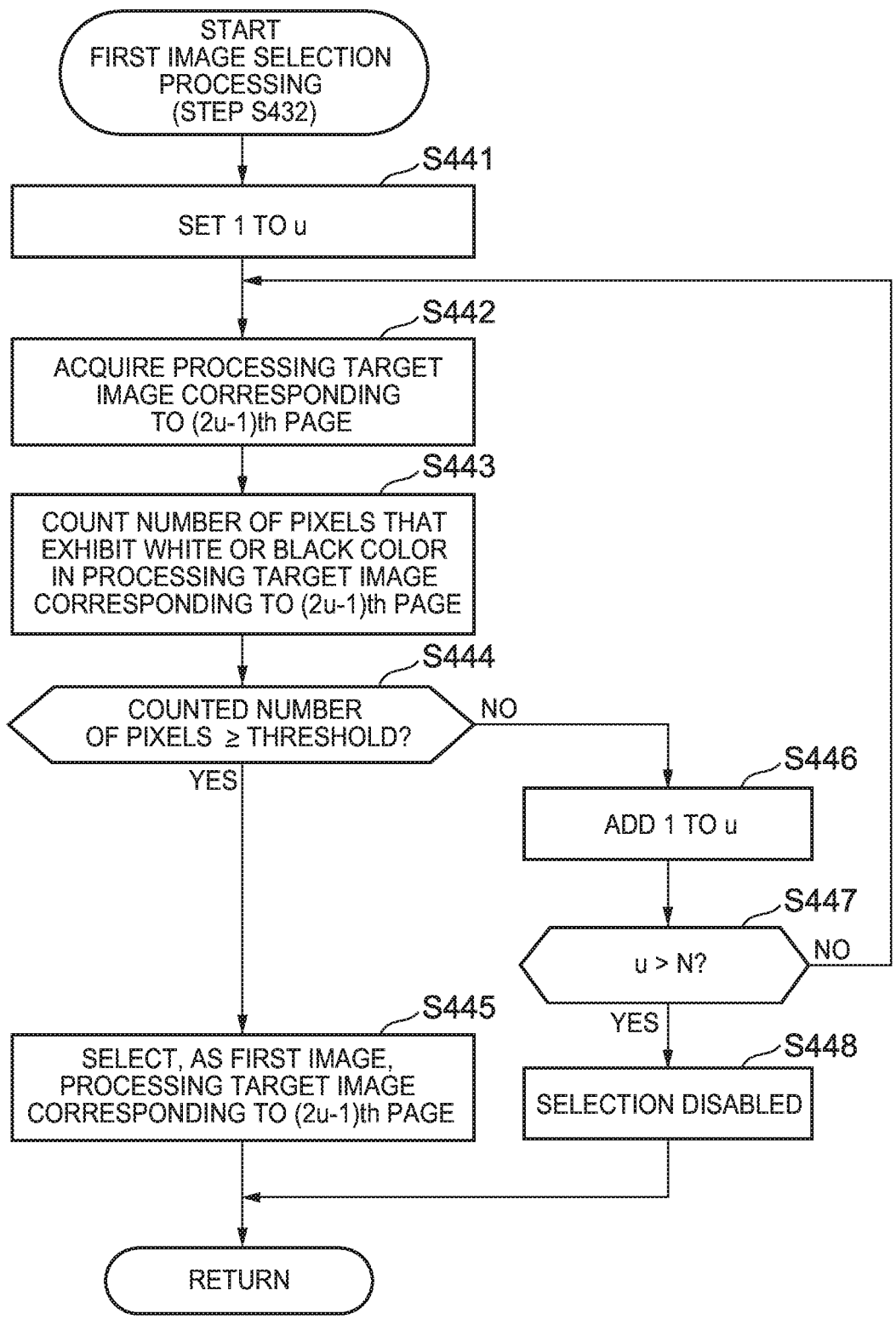
FIG. 20 is a flowchart showing a flow of first image selection processing according to Embodiment 4.

Specifically, as shown in FIG. 20, the first image selection unit 447 sets 1 to a variable u (step S441). Here, u is an integer of 1 to N.

The first image selection unit 447 acquires processing target image data 131_2u-1 indicative of a processing target image corresponding to the (2u-1)th page. Thus, the first image selection unit 447 acquires the processing target image corresponding to the (2u-1)th page (step S442).

The first image selection unit 447 counts pixels indicative of white or black color in the processing target image corresponding to the (2u-1)th page (step S443).

Here, for example, it can be determined whether each pixel is white or not by determining whether a difference between the pixel value of each RGB component and the average value falls within a predetermined range, and whether the luminance is more than a predetermined value. Further, for example, it can be determined whether each pixel is black or not by determining whether a difference between the pixel value of each RGB component and the average value falls within a predetermined range, and whether the luminance is less than a predetermined value.

The first image selection unit 447 determines whether the number of pixels counted at step S443 is larger than or equal to a predetermined threshold value (step S444).

When determining that the counted number of pixels is larger than or equal to the threshold value (Yes at step S444), the first image selection unit 447 selects, as the first image, a processing target image corresponding to the (2u-1)th page (step S445). Thus, the first image selection unit 447 ends the first selection processing (step S432) and returns to the image processing.

When determining that the counted number of pixels is not larger than or equal to the threshold value (No at step S444), the first image selection unit 447 adds 1 to the variable u (step S446).

The first image selection unit 447 determines whether the variable u to which 1 is added at step S446 is larger than N (step S447).

When determining that the variable u is not larger than N (No at step S447), the first image selection unit 447 returns to the processing step S442.

When determining that the variable u is larger than N (Yes at step S447), the first image selection unit 447 performs selection disabling processing (step S448) because the page P corresponding to the processing target image reaches the back cover. In the selection disabling processing (step S448), for example, a first selection disabling flag is set to indicate that no processing target image suitable for the first image was able to be selected. Then, the first image selection unit 447 ends the first image processing (step S432) and returns to the image processing.

Thus, a page P with only characters on paper as the background and closest to the cover of the book B can be automatically selected by performing this first image processing (step S432).

As shown in FIG. 19A, based on whether the first selection disabling flag is set, the first image selection unit 447 determines whether the first image was able to be selected (step S433).

When the first selection disabling flag is set, the first image selection unit 447 determines that no first image was able to be selected (No at step S433), ends the shading correction processing (step S413), and returns to the image processing.

When the first selection disabling flag is not set, the first image selection unit 447 determines that the first image was able to be selected (Yes at step S433). In this case, the first correction amount acquiring unit 139 acquires the luminance of pixels in each block obtained by dividing the first image selected at step S432 (step S423). The details of processing performed at step S423 are substantially the same as those of step S123.

Figure 19B:
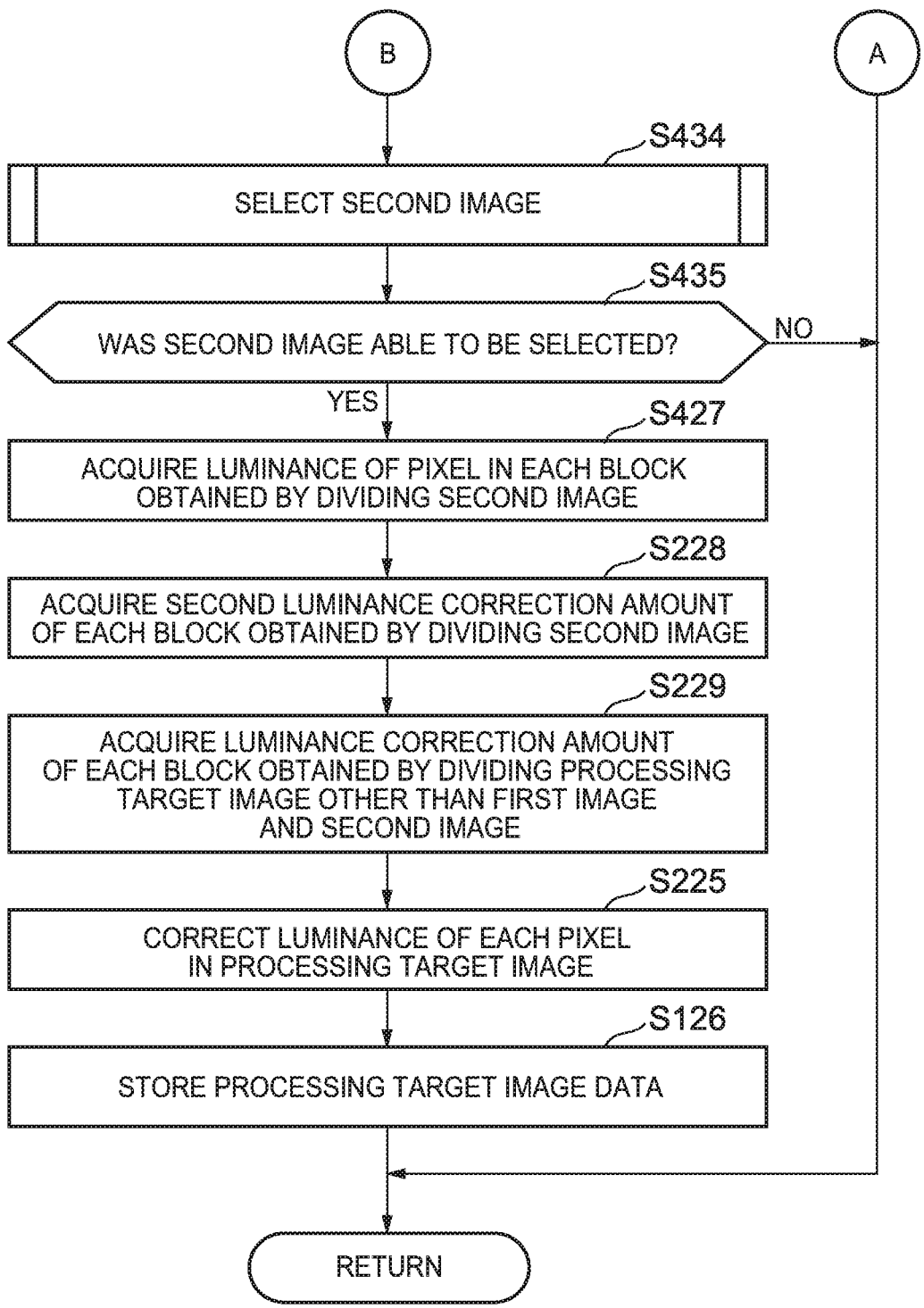

After processing step S124 is performed, the second image selection unit 448 selects a second image as shown in FIG. 19B (step S434).

Figure 21:
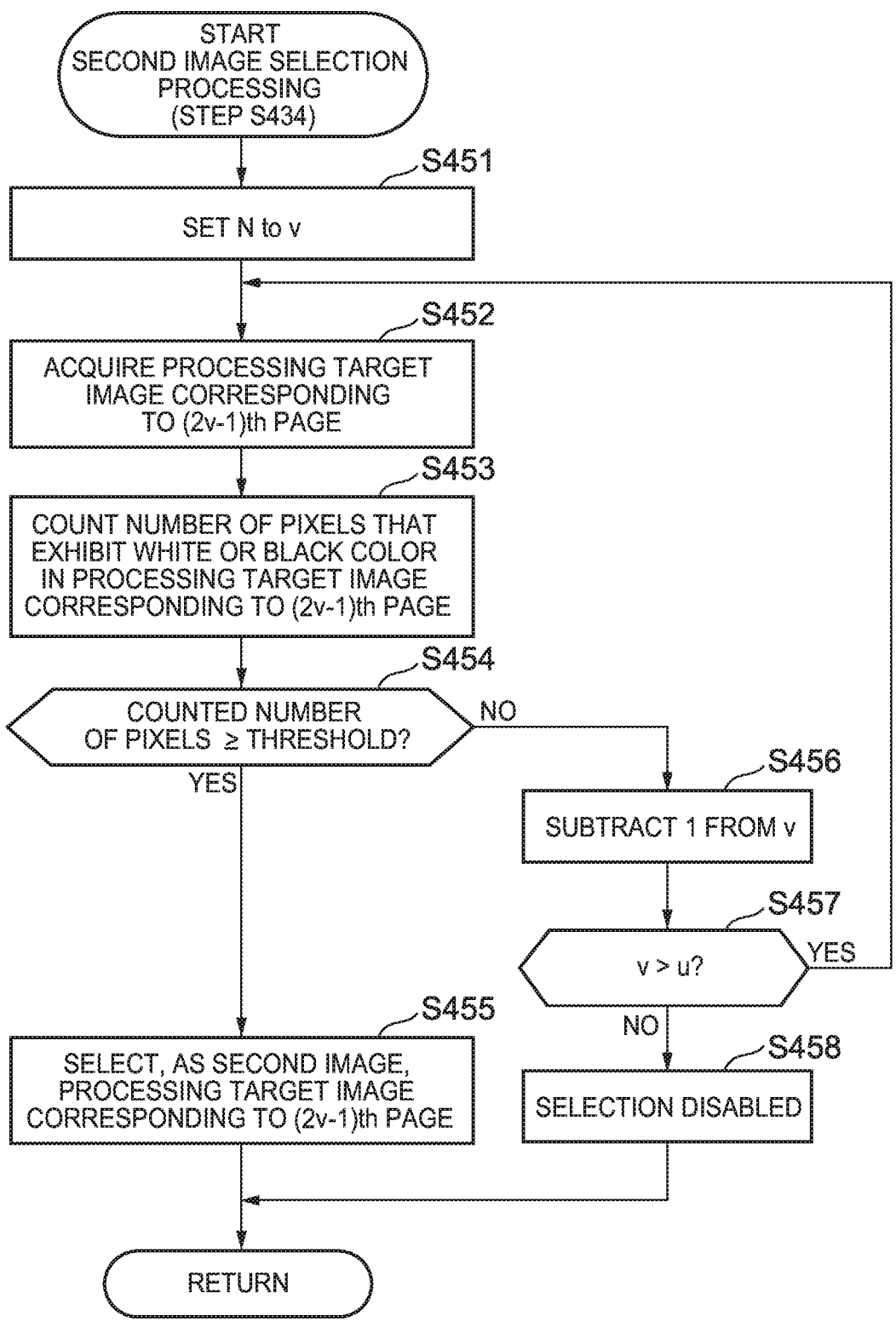
FIG. 21 is a flowchart showing a flow of second image selection processing according to Embodiment 4.

Specifically, as shown in FIG. 21, the second image selection unit 448 sets N to a variable v (step S451).

Here, v is an integer of 1 to N.

The second image selection unit 448 acquires a processing target image data 131_2v-1 indicative of a processing target image corresponding to the (2v-1)th page. Thus, the second image selection unit 448 acquires the processing target image corresponding to the (2v-1)th page (step S452).

The second image selection unit 448 counts pixels indicative of white or black color in the processing target image corresponding to the (2v-1)th page (step S453).

Here, whether each pixel is white or not can be determined in the same manner as that at step S443.

The second image selection unit 448 determines whether the number of pixels counted at step S453 is larger than or equal to a predetermined threshold value (step S454).

When determining that the counted number of pixels is larger than or equal to the threshold value (Yes at step S454), the second image selection unit 448 selects, as the second image, the processing target image corresponding to the (2v−1)th page (step S455). Thus, the second image selection unit 448 ends the second selection processing (step S434) and returns to the image processing.

When the counted number of pixels is not larger than or equal to the threshold value (No at step S454), the second image selection unit 448 subtracts 1 from the variable v (step S456).

The second image selection unit 448 determines whether the variable v from which 1 is subtracted at step S456 is larger than the variable u indicative of the page number of the page P corresponding to the processing target image selected at step S432 as the first image.

When determining that the variable v is larger than the variable u (Yes at step S457), the second image selection unit 448 returns to the processing step S452.

When determining that the variable v is not larger than the variable u (No at step S457), the second image selection unit 448 performs selection disabling processing (step S458) because the page P corresponding to the processing target image is closer to the cover than the first image. In the selection disabling processing (step S458), for example, a second selection disabling flag is set to indicate that no processing target image suitable for the second image was able to be selected. Then, the second image selection unit 448 ends the second selection processing (step S434) and returns to the image processing.

Thus, a page P with only characters on paper as the background and closest to the cover of the book B can be automatically selected by performing this second image processing (step S434).

Based on whether the second selection disabling flag is set, the second image selection unit 448 determines whether the second image was able to be selected (step S435).

When the second selection disabling flag is set, the second image selection unit 448 determines that no second image was able to be selected (No at step S435), ends the shading correction processing (step S413), and returns to the image processing.

When the second selection disabling flag is not set, the second image selection unit 448 determines that the second image was able to be selected (Yes at step S435). In this case, the second correction amount acquiring unit 242 acquires the luminance of pixels in each block obtained by dividing the second image selected at step S434 (step S427). The details of processing performed at step S427 are substantially the same as those of step S227.

Subsequently, processing steps S228 and S229, S225, and S126 are performed in order. Thus, the shading correction processing (step S413) is ended, and the image processing is performed.

Embodiment 4 of the present invention is described above.

According to the embodiment, the processing load for correcting the luminance unevenness of multiple processing target images captured while the book B is open can be reduced like in Embodiment 2.

Further, according to the embodiment, the luminance unevenness of a processing target image corresponding to a page P including a color photo, a color chart, and the like can be corrected appropriately like in Embodiment 2.

Further, in the embodiment, since the first image and the second image are automatically selected, the luminance unevenness of multiple processing target images can be corrected appropriately while saving the user time and effort in specifying the first image and the second image.

The embodiment may be modified as follows.

For example, two or more may be adopted as the predetermined number in the embodiment. For example, the first image selection processing (step S432) can be repeated until two or more of the predetermined number of processing target images are selected to select two or more processing target images as the first image. Further, for example, the second image selection processing (step S434) can be repeated until two or more of the predetermined number of processing target images are selected to select two or more processing target images as the second image.

In this case, the processing can be performed in the same way as the case where two or more of the multiple processing target images are selected as the first image and the second image, respectively, in each of the modifications of Embodiments 1 and 2. This can lead to not only a reduction in the processing load for correcting the luminance unevenness of multiple processing target images captured while the book B is open, but also more suitable correction of luminance unevenness as described in each modification.

For example, the first image selection unit 447 may select, as the first image, a predetermined number of processing target images in order from a page P closest to the back cover of the book B and open at the time of imaging. Further, the second image selection unit 448 may select, as the second image, a predetermined number of processing target images in order from a page P closest to the cover of the book B and open at the time of imaging. Thus, processing target images corresponding to pages close to either one of the cover and the back cover can be set as first image, and processing target images corresponding to pages close to the other of the cover and the back cover can be set as the second image. As a result, a luminance correction amount Yab gradually varying from page to page corresponding to processing target images can be acquired. Thus, the luminance unevenness of multiple processing target images can be corrected appropriately.

For example, the first image selection unit 447 according to the embodiment may be incorporated in the terminal device according to Embodiment 1. Further, the first image selection unit 447 and the second image selection unit 448 according to the embodiment may be incorporated in the terminal device according to Embodiment 3. Even in these cases, since the first image, or the first image and the second image are automatically selected, the luminance unevenness of the multiple processing target images can be corrected appropriately while saving the user time and effort in specifying the first image and the second image.

While the embodiments and modifications of the present invention are described above, the present invention is not limited to these embodiments and modifications. Each embodiment and each modification may be combined accordingly. Further, each embodiment may be modified as follows.

For example, each of multiple processing target images may be an image captured by imaging two facing pages of the book B. Even when each embodiment is thus modified, the modification has the same effect as each embodiment.

For example, the core of performing imaging processing and image processing respectively performed by an imaging device and an image processing apparatus composed of a CPU, a RAM, a ROM, and the like may be a dedicated system, or the imaging processing and the image processing can be performed by using a smartphone, a tablet terminal, a personal computer, or the like. For example, a computer program causing the smartphone, the tablet terminal, the personal computer, or the like to perform either or both of the imaging processing and the image processing may be stored on a computer-readable recording medium (a flexible disk, a CD-ROM (Compact Disc Read Only Memory), a DVD-ROM (Digital Versatile Disc Read Only Memory), or the like) and distributed, so that the smartphone, the tablet terminal, the personal computer, or the like that performs either or both of the imaging processing and the image processing will be configured by installing this computer program. Further, the computer program may be stored in a storage device provided in a server on a communication network such as the Internet so that the smartphone, the tablet terminal, the personal computer, or the like that performs either or both of the imaging processing and the image processing will be configured by downloading this computer program or the like.

For example, when the function of an image processing apparatus is implemented by being shared between an OS (Operating System) and an application program, or by the OS and the application program in cooperation with each other, only the application program may be stored on a recording medium or in a storage device.

For example, it is also possible to deliver a computer program through a communication network by superimposing the computer program on a carrier wave. For example, the computer program may be posted in a bulletin board system (BBS) on the communication network so that the computer program will be delivered through the network. Then, this computer program may be started to run under the control of the OS in the same manner as other application programs so that the above-mentioned processing can be performed.

While preferred embodiments of the present invention are described above, the present invention is not limited to the specific embodiments, and the scope of the present invention includes the inventions described in appended claims and their equivalents.

What is claimed is:

1. An image processing apparatus comprising:
  a storage which stores images; and
  a processor which performs functions comprising:
    obtaining processing target images by imaging a target object having pages bound together while opening the target object;
    dividing a first image among the processing target images into first blocks and acquiring a first luminance correction amount of each of the first blocks based on a luminance of pixels corresponding to each of the first blocks;
    dividing a second image among the processing target images into second blocks, the second image being different from the first image, and acquiring a second luminance correction amount of each of the second blocks based on a luminance of pixels corresponding to each of the second blocks;
    dividing an arbitrary third image among the processing target images into third blocks, and acquiring a third luminance correction amount of each of the third blocks based on the first luminance correction amount and the second luminance correction amount which correspond to each of the third blocks;
    correcting a luminance of each of pixels in the third image based on the third luminance correction amount of each of the third blocks; and
    storing processing target images, a luminance of each of pixels of which has been corrected, in the storage.

2. An image processing system comprising:
  the image processing apparatus according to claim 1; and
  an imaging device which captures each of the processing target images.

3. The image processing system according to claim 2, further comprising a page-turning device which turns the pages of the target object,
  wherein the imaging device performs imaging when a page to be imaged is opened by the page-turning device.

4. The image processing apparatus according to claim 1, further comprising an input device which accepts an instruction to select, as the first image, at least one of the processing target images.

5. The image processing apparatus according to claim 4, wherein the input device further accepts an instruction to select, as the second image, at least one of the processing target images.

6. The image processing apparatus according to claim 1, wherein the processor further performs a function of selecting, as the first image, a predetermined number of processing target images among the processing target images based on a number of pixels that exhibit a predetermined color in each of the processing target images.

7. The image processing apparatus according to claim 6, wherein the selecting selects, as the first image, the predetermined number of processing target images in order from a portion of the target object, which is open at a time of imaging and closest to one of a cover and a back cover of the target object, based on the number of pixels that exhibit the predetermined color in each of the processing target images.

8. The image processing apparatus according to claim 1, wherein the processor further performs a function of selecting, as the second image, a predetermined number of processing target images among the processing target images based on a number of pixels that exhibit a predetermined color in each of the processing target images.

9. The image processing apparatus according to claim 8, wherein the selecting selects, as the second image, the predetermined number of processing target images in order from a portion of the target object, which is open at a time of imaging and closest to one of a cover and a back cover of the target object, based on the number of pixels that exhibit the predetermined color in each of the processing target images.

10. The image processing apparatus according to claim 1, wherein the third luminance correction amount is acquired by interpolating the first luminance correction amount and the second luminance correction amount of each corresponding block between the processing target images according to a portion of the target object, which is open to obtain each of the processing target images.

11. The image processing apparatus according to claim 10, wherein the third luminance correction amount is acquired by performing linear interpolation between the first luminance correction amount and the second luminance correction amount.

12. The image processing apparatus according to claim 1, wherein the luminance of each of the pixels in the third image is corrected by:
  acquiring a luminance correction amount of each of pixels in each of the third blocks, based on the third luminance correction amount of each of the third blocks; and
  correcting the luminance of each of the pixels in the third image based on the luminance correction amount of each of the pixels in the third image.

13. The image processing apparatus according to claim 12, wherein the luminance correction amount of each of the pixels in each of the third blocks is acquired by interpolating the luminance correction amount of each of the third blocks according to a positional relationship with a predetermined representative pixel thereof, for each of the processing target images.

14. The image processing apparatus according to claim 13, wherein the luminance correction amount of each of the pixels in the processing target images is acquired by performing linear interpolation on the luminance correction amount of each of the third blocks.

15. The image processing apparatus according to claim 1, wherein each of the processing target images is an image obtained by imaging one of two facing pages of the target object sequentially.

16. The image processing apparatus according to claim 1, wherein each of the processing target images is an image obtained by imaging two facing pages of the target object.

17. An image processing apparatus comprising:
a storage which stores images; and
a processor which performs functions comprising:
obtaining processing target images by imaging a target object having pages bound together while opening the target object;
selecting, as a first image, a predetermined number of processing target images among the processing target images based on a number of pixels that exhibit a predetermined color in each of the processing target images;
acquiring a first luminance correction amount of each of first blocks obtained by dividing the first image, based on a luminance of pixels corresponding to each of the first blocks;
correcting a luminance of each of pixels in the processing target images based on the first luminance correction amount of each of the first blocks; and
storing, in the storage, the processing target images the luminance of each of the pixels of which has been corrected.

18. An image processing method comprising:
obtaining processing target images by imaging a target object having pages bound together while opening the target object;
selecting, as a first image, a predetermined number of processing target images among the processing target images based on a number of pixels that exhibit a predetermined color in each of the processing target images;
acquiring a first luminance correction amount of each of first blocks obtained by dividing the first image, based on a luminance of pixels corresponding to each of the first blocks;
correcting a luminance of each of pixels in the processing target images based on the first luminance correction amount of each of the first blocks; and
storing, in a storage, the processing target images the luminance of each of the pixels of which has been corrected.

19. A non-transitory computer-readable recording medium which stores a program executable by a processor, the program controlling the processor to perform functions comprising:
obtaining processing target images by imaging a target object having pages bound together while opening the target object;
selecting, as a first image, a predetermined number of processing target images among the processing target images based on a number of pixels that exhibit a predetermined color in each of the processing target images;
acquiring a first luminance correction amount of each of first blocks obtained by dividing the first image, based on a luminance of pixels corresponding to each of the first blocks;
correcting a luminance of each of pixels in the processing target images based on the first luminance correction amount of each of the first blocks; and
storing, in a storage, the processing target images the luminance of each of the pixels of which has been corrected.

* * * * *